US005666125A

United States Patent [19]

Luxon et al.

[11] Patent Number: 5,666,125

[45] Date of Patent: *Sep. 9, 1997

[54] RADIATION SHIELDING AND RANGE EXTENDING ANTENNA ASSEMBLY

[76] Inventors: Norval N. Luxon, 8462 Traminer Ct., San Jose, Calif. 95135; Kevin A. Luxon, 30041 Tessier St., Suite 282, Laguna Niguel, Calif. 92677; R. Joseph Milelli, 5132 Mt. Tam Cir., Pleasanton, Calif. 94588

[ * ] Notice: The term of this patent shall not extend beyond the expiration date of Pat. No. 5,507,012.

[21] Appl. No.: 480,905

[22] Filed: Jun. 8, 1995

Related U.S. Application Data

[63] Continuation-in-part of Ser. No. 404,435, Mar. 15, 1995, which is a continuation-in-part of Ser. No. 283,526, Aug. 1, 1994, Pat. No. 5,507,012, which is a continuation-in-part of Ser. No. 33,569, Mar. 17, 1993, abandoned.

[51] Int. Cl.$^6$ .................... H01Q 1/24; H04B 1/38

[52] U.S. Cl. .................... 343/702; 343/841; 455/422

[58] Field of Search .................... 343/702, 841, 343/793, 810, 815, 817, 818, 819; 455/89, 90, 300; H01Q 1/24; H04B 1/38

[56] References Cited

U.S. PATENT DOCUMENTS

| | | | |
|---|---|---|---|
| 2,480,143 | 8/1949 | Laxner | 343/841 |
| 2,490,782 | 12/1949 | Collup | 343/841 |
| 2,599,944 | 6/1952 | Salisbury | 343/841 |

(List continued on next page.)

FOREIGN PATENT DOCUMENTS

| | | |
|---|---|---|
| 2091628 | 9/1937 | Canada . |
| 2091608 | 9/1937 | Canada . |
| 59-92629 | 5/1984 | Japan . |
| 61-56524 | 3/1986 | Japan . |
| 0254630 | 2/1990 | Japan . |
| 4127723 | 4/1992 | Japan . |

OTHER PUBLICATIONS

*Detecting Microwave Radiation Hazards,* 1961, Electronics World, vol. 65, No. 6, pp. 31–33 and 78–79.

*McCaw to Study Cellular Phones as Saftey Questions Affect Sales,* Wall Street Journal, Jan. 29, 1993.

*CellShield Brochure,* received by PTO Mar. 1, 1993.

*Cell Shield Innovation in Cellular Radiation Protection,* publication date unknown—sometime after Feb. 24, 1993.

(List continued on next page.)

*Primary Examiner*—Hoanganh T. Le

*Attorney, Agent, or Firm*—John J. Daniels

[57] ABSTRACT

A hand-held radio telephone for communication through an orbiting satellite is provided. An antenna assembly is fixed to the hand-held radio telephone and includes a radiation absorber defining an open curved shape in cross section, so as to define an open transmission area. An antenna is disposed adjacent to the open transmission area so that during use of the hand-held radio telephone some of the radiation signal emitted from the antenna is absorbed by the radiation absorber. The radiation signal that is not absorbed by the radiation absorber is transmitted through the open transmission area for reception by a remote receiver, such as an orbiting satellite. At least one parasitic radiation redirection element receives radiation emitted from the antenna. The radiation received by the parasitic radiation redirection element is directed toward the open transmission area, so as to extend a transmission range of the antenna assembly, and thus extend the transmission range of the hand-held radio telephone. By this construction, at least some of the radiation signal that is emitted from the antenna in directions toward the user is blocked by the radiation absorber from being transmitted to the user. Thus, in accordance with the present invention, the inventive hand-held radio telephone has an antenna assembly capable of preventing unwanted exposure of the user to potentially harmful radiation, while providing an enhanced and extended transmission signal to enable improved communication.

20 Claims, 25 Drawing Sheets

U.S. PATENT DOCUMENTS

| | | | |
|---|---|---|---|
| 2,712,603 | 7/1955 | Bridges et al. | 343/841 |
| 3,196,442 | 7/1965 | Leffelman et al. | 343/841 |
| 3,564,111 | 2/1971 | Breitenbach | 174/36 |
| 4,189,730 | 2/1980 | Murdock | 343/841 |
| 4,471,493 | 9/1984 | Schober | 455/90 |
| 4,750,957 | 6/1988 | Gustafson | 156/92 |
| 4,831,210 | 5/1989 | Larson et al. | 174/35 MS |
| 4,845,772 | 7/1989 | Metroka et al. | 379/61 |
| 4,964,161 | 10/1990 | Trowbridge, Jr. | 379/452 |
| 4,980,564 | 12/1990 | Steelmon | 250/505.1 |
| 5,012,114 | 4/1991 | Sisson, Jr. | 250/519.1 |
| 5,014,346 | 5/1991 | Phillips et al. | 343/702 |
| 5,098,735 | 3/1992 | Henry | 427/8 |
| 5,124,889 | 6/1992 | Humbert et al. | 361/424 |
| 5,139,850 | 8/1992 | Clarke et al. | 428/192 |
| 5,150,282 | 9/1992 | Tomura et al. | 361/424 |
| 5,170,173 | 12/1992 | Krenz et al. | 343/702 |
| 5,241,321 | 8/1993 | Tsao | 343/700 MS |
| 5,245,745 | 9/1993 | Jensen et al. | 343/700 MS |
| 5,247,182 | 9/1993 | Servant et al. | 250/516.1 |
| 5,260,513 | 11/1993 | Giles et al. | 174/35 MS |
| 5,262,792 | 11/1993 | Egashira | 343/702 |
| 5,309,164 | 5/1994 | Dienes et al. | 343/700 MS |
| 5,334,800 | 8/1994 | Kenney | 174/35 R |
| 5,335,366 | 8/1994 | Daniels | 343/702 |
| 5,336,848 | 8/1994 | Katz | 174/35 R |
| 5,336,896 | 8/1994 | Katz | 250/515.1 |
| 5,338,896 | 8/1994 | Danforth | 174/35 R |
| 5,367,309 | 11/1994 | Tashijian | 343/702 |
| 5,371,509 | 12/1994 | Wallace, Jr. et al. | 343/741 |
| 5,373,304 | 12/1994 | Nolan et al. | 343/841 |
| 5,444,866 | 8/1995 | Cykiert | 455/89 |
| 5,507,012 | 4/1996 | Luxon et al. | 343/702 |

OTHER PUBLICATIONS

*Questions & Answers About Electric and Magnetic Fields Associated with the Use of Electric Power,* Nov. 1994, National Institute of Environmental Health Sciences, US Department of Energy.

*Today's View of Magnetic Fields,* IEEE Spectrum, Dec. 1994.

*EM Interaction of Handset Antennas and a Human in Personal Communications,* Jensen et al., Proceedings of the IEEE, vol. 83, No. 1, Jan. 1995.

*Ericson and Pac Bell Target Hearing Aid Interference Solutions,* Kelly Pate, RCR, Feb. 26, 1996.

*Digital Phones May Have Flaws,* Karr et al., Wall Street Journal, Mar. 12, 1996.

*Electromagnetic Energy Exposure of Simulated Users of Portable Cellular Telephones,* Balzano et al., IEEE Transactions on Vehicular Technology, vol. 44, No. 3, Aug. 1995.

*Internal Broadband Antenna for Hand–Held Terminals with Reduced Gain in the Direction of the User's Head,* Fuhl et al., IEEE 1995.

*Integrated Antennas for Hand–Held Telephones with Low Absorption,* Pedersen et al., IEEE 1994.

*Environmental Risk Factors for Primary Malignant Brain Tumors: A Review,* Wrensch et al., Journal of Neuro–Oncology 17: 47–64, 1993.

*Acute Low–Intensity Microwave Exposure Increases DNA Single–Strand Breaks in Rat Brain Cells,* Lai et al., Bioelectromagnetics 16:207–210, 1995.

*Test Finds Some Interference Between Hearing Aids, Phone,* Sakelaris, RCR, Feb. 5, 1996.

*GSM Controversy Swirls Around Pac Bell's Plans,* Crabtree, Wireless Week, Feb. 26, 1996.

*The Antenna Company Brochure—Drive Time Kit,* Publication Date Unknown.

*Wireless Industry Pledges to Fix Hearing Aid Troubles* RCR, vol. 14, No. 20, Oct. 23, 1995.

*PCS Wireless, Inc. Brochure—PCS Tecnology at Work,* Publication date unknown.

*Antenna Design Considerations for Personal Communications User Protection,* Sadeghzadeh et al., IEEE 1995.

*Simple Retractable Monopole Antenna with Small Mismatch Loss and High Radiation Efficiency for Cellular Portable Phones,* Seki et al., IEEE 1995.

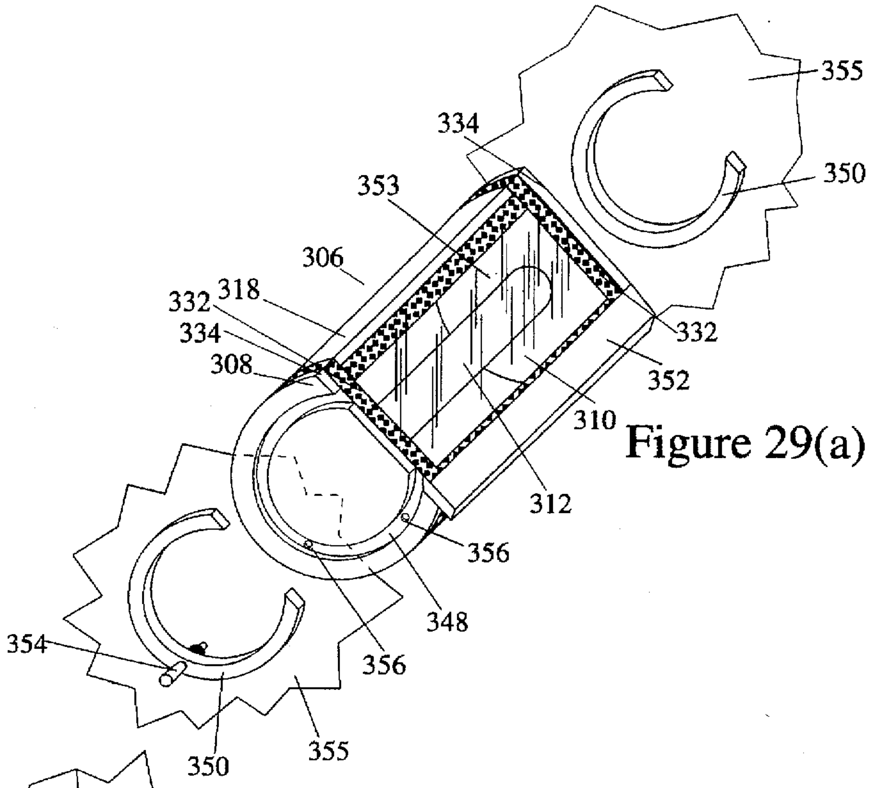
Figure 29(a)
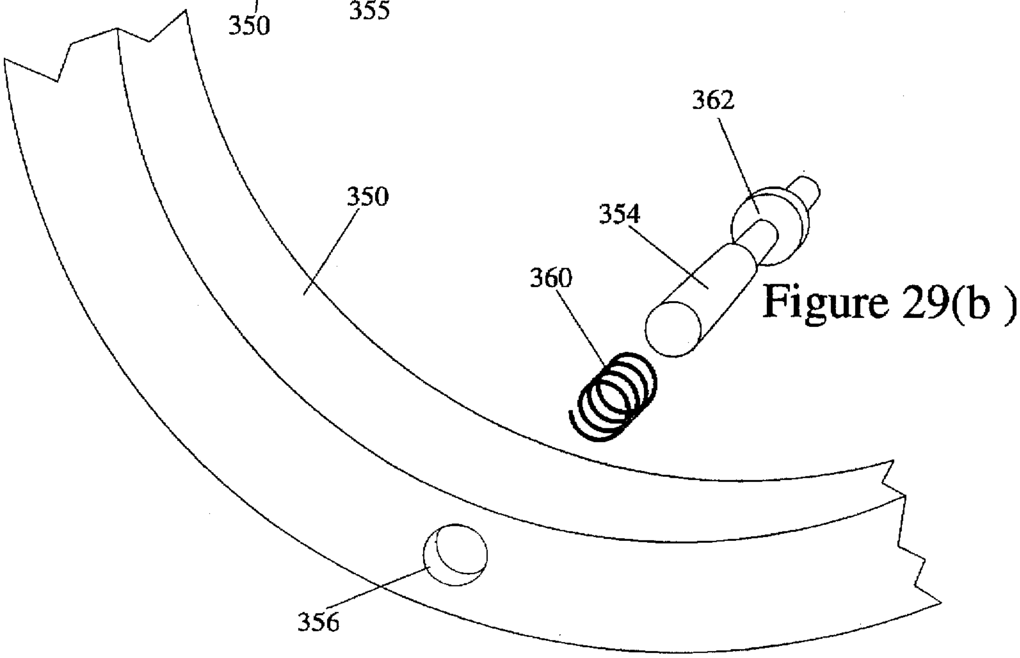
Figure 29(b )

RADIATION SHIELDING AND RANGE EXTENDING ANTENNA ASSEMBLY

CROSS REFERENCE TO RELATED APPLICATIONS

This application is a continuation-in-part of application Ser. No. 08/404,435, filed Mar. 15, 1995, pending, which is a continuation-in-part of application Ser. No. 08/283,526, filed Aug. 1, 1994, U.S. Pat. No. 5,507,012, which is a continuation-in-part of application Ser. No. 08/033,569, filed Mar. 17, 1993, abandoned.

BACKGROUND OF THE INVENTION

1. Field of the Invention

The present invention relates to portable telephone and other personal communication apparatus and, more particularly, to protective shield apparatus for absorbing microwave energy to protect a user of the portable telephone and personal communication apparatus from the electromagnetic microwave frequency radiation emanating from such apparatus and to extend the transmission range of such apparatus by redirecting the microwave radiation away from the user of the apparatus. The present invention further pertains to a hand-held radio telephone and antenna assembly for the same. More particularly, the present invention further pertains to an hand-held radio telephone having an antenna assembly effective for enhancing and extending the transmission range of a radiation signal emitted by the hand-held radio telephone, and effective for preventing potentially harmful radiation exposure of the user of the hand-held radio telephone.

2. Description of the Prior Art

There have been a number of contemporary inquires regarding the safety of portable telephones and, more particularly, cellular telephones and wireless communication devices, with respect to the potential danger to the user from electromagnetic microwave radiation associated with the transmission of the signals from such apparatus. When using a hand-held cellular telephone, the user holds the phone with his hand and places the phone to his head so that his ear is in contact with the ear piece of the telephone, and his mouth is at a location close to the mouthpiece of the telephone. This positions the antenna, which usually extends from the top surface of the telephone and/or is disposed on the inside of the telephone case, in close proximity with the biological tissue of the user's hand and head as it transmits electromagnetic radiation. It has been determined that the presence of the biological tissue alters the radiation pattern and reduces the antenna gain, and, that between 48 and 68% of the power delivered to the antenna of a hand-held cellular telephone is absorbed by the head and hand of the user (see, *EM Interaction of Handset Antennas and a Human in Personal Communications,* Proceedings of the IEEE, Vol. 83, No. 1, January 1995).

The power absorbed by the head and hand reduces the strength of the radiation signal emitted from the antenna for communication. In addition, by requiring the antenna to output a stronger signal, the power absorbed by the head and hand decreases the usable life of the battery of the cellular telephone.

Further, contemporary inquiries are investigating the possibilities that the radiation absorbed by the head and hand may cause cancer or create other health risks or hazards to the user in association with the use of such apparatus. Research is only now being done looking into the potential link between cellular telephone use and detrimental biological effects,' such as brain tumors. However, epidemiological studies have suggested that a link exists between exposure to power frequency electric and magnetic fields and certain types of cancer, primarily leukemia and brain cancer (see, *Questions and Answers About Electric and Magnetic Fields Associated With the Use of Electric Power,* National Institute of Environmental Health Sciences, U.S. Department of Energy, November 1994). It is clear that consumers will demand protection from hand-held cellular phone radiation as more and more evidence is discovered linking cellular telephone use with potential health hazards.

In response to the anticipated consumer demand, and to provide protection against health risks, the apparatus of the present invention utilizes electromagnetic radiation absorbing materials disposed about the antenna and portable wireless transmitting apparatus to shield or protect the user from the potentially harmful radiation emissions from the wireless communication apparatus. In addition, to provide enhanced cellular telephone communications, the present invention extends the transmission range of such apparatus by redirecting the microwave radiation away from the user of the apparatus.

Typically, the broadcast from the portable telephones and wireless communication apparatus emit electromagnetic radiation in the microwave frequency range. An example of a prior art radiation shielding apparatus for a radio transmitting device is disclosed in U.S. Pat. No. 5,335,366, issued to Daniels. The shield apparatus of the present invention is disposed primarily about the antenna and transmitting apparatus, both inside and outside of the portable telephone and wireless communication apparatus itself.

A conventional cellular telephone communicates over hard wire phone lines by transmitting electromagnetic radiation signals between the mobile cellular telephone and stationary, ground-based transmission/reception units known as "cells". These cells are typically connected with a hard-wired telephone network, usually through a direct mechanical link. Thus, a user of a cellular phone is not confined by the traditional limitations of being mechanically linked with the hard-wired telephone network. Rather, the user of a cellular phone has mobility due to the radio transmission of the electromagnetic wave signals between the cellular phone and the cells, and is able to communicate via the hard-wired telephone network as long as the cellular phone is within range of a transmission/reception cell site.

The transmission from the portable cellular telephone is traditionally accomplished through an antenna. In a typical hand-held radio telephone, radio frequency transmitting/receiving circuitry is disposed in the interior and a transmitting/receiving antenna is disposed on the outside and/or in the interior of a single compact unit. This type of cellular phone has steadily increased in popularity because of the convenience and mobility afforded by its compact structure. Traditionally, these cellular phones transmit at a cellular frequency range between 800 and 900 megahertz and at a power any where from less than one to six or more watts.

FIG. 32 shows a typical configuration for a hand-held cellular phone, commonly known as a "flip phone". This conventional cellular phone has a main phone body 1 having an ear piece 2 disposed thereon. A mouthpiece 3 is flipped downward in an open position so that when the hand-held cellular phone is appropriately positioned by a user, the ear piece 2 is adjacent to the user's ear, while the mouthpiece 3 is adjacent to the user's mouth. An antenna 4, which may be telescoping or fixed, is disposed externally on the phone body 1. The antenna 4, which may include an antenna disposed inside the telephone case, emits electromagnetic radiation to send communication signals from the hand-held cellular phone to a distant ground-based cell of a cellular network, and receives electromagnetic radiation carrying communication signals from the cell. Thus, the user is able to communicate through the cellular network to the hard wire telephone network, or other receivers via radio signals transmitted from the cell.

However, the antenna 4 of a conventional hand-held radio telephone emits a radiation signal that exposes the user to the health risks now being associated with exposure to electromagnetic radiation in the cellular frequency band. At the present time the exact cause or extent of the health risks are not known, but, it is apparent that there is great demand for a means to shield the users of hand-held cellular phones from unwanted, and possibly harmful, exposure to the radiation generated by the cellular phone. Recent tests have shown that radio waves in and around the cellular frequency band can damage the blood-brain barrier, which protects the brain from toxins. Furthermore, radio frequencies, including the European cellular frequency, have been shown to damage the calcium coating in cells that regulate the passage of hormonal "messages" between cells. Some scientists believe that the brain tissue absorbs some of the power of the electromagnetic radiation. The exact empirical health risks which can be directly linked to the cellular phone are still not known. However, it is apparent that the users and future purchasers of cellular phones are demanding a means to protect themselves as much as possible from exposure to the radiation generated by the cellular phone.

Antenna configurations include the familiar wandlike monopole, which extends from the top of the telephone, interior antennas, which are disposed within the telephone case, and flush mounted antennas, which are usually located on the sides, back or top of the telephone. Each of these antenna configurations suffers from the problems of power being absorbed by the head and hand of the user. In particular, the flush mounted antennas suffer from a higher degree of electromagnetic interaction, since the head and hand are typically disposed very close to the antenna during use of the telephone. Also, the hand holding the telephone tends to mask the flush mounted antenna, causing a detuning effect on the antenna resonant frequency and impedance. This detuning can reduce the communication range of the telephone (see, *EM Interaction of Handset Antennas and a Human in Personal Communications,* Proceedings of the IEEE, Vol. 83, No. 1, January 1995).

The currently used ground-based cell sites have a number of serious disadvantages. The user of a cellular phone must be within the transmission/reception range of a ground-based cell site for the cellular phone to function. The transmission/reception range between a cellular phone and a ground-based cell site is severely limited by the existence of mountains, buildings or other structures disposed between the ground-based cell site and the cellular phone. Therefore, in places where there are tall buildings, mountains or other obscuring structures it is necessary to maintain a large number ground-based cell sites. Also, there are many locations where it is not practical or possible to maintain a cell site, such as off-shore or sparsely populated locations. Thus, compared to the vast expanses of the Earth, there are currently very few places where a cellular telephone has any use.

To overcome the problems associated with ground-based cell sites, a new means of communication is on the technological horizon of the wireless communications industry. Satellites orbiting the Earth can be used as a means for communication between ground-based locations. The use of orbiting satellites as a communications link has a number of distinct advantages over the use of ground-based cell sites. For example, since the satellites are located high overhead, there is much less chance of a signal being obstructed by a land or building feature, allowing for clearer, more consistent communication. Also, a network of relatively few orbiting satellites can provide communication over the entire surface of the Earth. Thus, satellites can enable communication from remote locations, such as mid-ocean and mountain tops, where it is impractical or impossible to build and maintain cell sites. Also, an expensive to erect and to maintain infrastructure comprising numerous ground-based cell sites is not necessary, thereby allowing developing countries to have the advantages of a communications systems without requiring the investment in numerous expensive components. Conventionally, the use of satellites for communication has required expensive and awkward equipment, typically having a relative large antenna assembly for transmission and reception of a radiation signal. However, there are currently being developed satellite communication systems that will enable communication between small hand-held radio units. A technological problem to be addressed is the design of an antenna assembly that has the transmission range necessary for effective use of an orbiting satellite, while having low power consumption and compact size. The present invention has been devised to overcome the drawbacks of the conventional art and provides a hand-held radio telephone capable of preventing unwanted exposure of the user to radiation, and having and enhanced and extended transmission signal.

SUMMARY OF THE INVENTION

The present invention is intended to provide a solution to the problems associated with the possibly harmful exposure to radiation during radio telephone use, and to provide a means for extending the signal range of a radiation signal emitted by the radio telephone. An object of the present invention is to provide a shield apparatus for shielding an antenna and related transmitting elements of portable telephones and other wireless communication apparatus. The shield apparatus includes portions which block by absorption the microwave radio frequency radiation which is directed toward the user of the apparatus, and allows the microwave radiation to be redirected and broadcast outwardly from the antenna in the directions away from the user, and thus extends the transmission range of the apparatus.

An object of the present invention is to provide new and useful radiation absorption and blocking apparatus. Another object of the present invention is to provide new and useful apparatus for portable telephones and wireless communication apparatus to block electromagnetic radio frequency radiation from reaching the user of such apparatus. Another object of the present invention is to provide new and useful portable telephone and wireless communication apparatus for directing microwave energy away from a user of the apparatus and thereby extend the transmission range of the apparatus. Another object of the present invention is to provide new and useful shield apparatus for the transmitting apparatus antenna of portable telephone and other wireless communication apparatus. Another object of the present invention is to provide new and useful hand-held communications apparatus which includes shielding for the user and which directs radiation away from the user and extends the transmission range of the apparatus by directing the radiation away from the user. Another object of the present invention is to provide universal shield apparatus for the antenna of a hand-held portable telephone and wireless communication apparatus. Another object of the present invention is to provide new and useful radiation blocking apparatus between hand-held portable telephone and other wireless communication apparatus and the user thereof.

Still another object of the present invention is to provide a hand-held cellular telephone that is effective for radio communication with a remote receiver, such as an orbiting satellite or a ground-based antenna receiver. Yet another object of the present invention is to provide an antenna assembly capable of preventing unwanted exposure of transmitted radiation from the inventive hand-held radio telephone, while allowing the transmission of a radiation signal to a remote receiver, such as an orbiting satellite. A further object of the present invention is to provide such a hand-held radio telephone and antenna assembly having range extension capabilities obtained due to an enhanced and directed transmission of the radiation signal. Yet another object of the present invention is to provide a hand-held radio telephone and antenna assembly having a transmitted signal angle adjustment mechanism for adjusting the angle at which the transmitted radiation signal is directed from the hand-held radio telephone.

In accordance with the present invention, a hand-held radio telephone is provided for communication via a remote receiver, such as a ground-based cell site or an orbiting satellite. An antenna assembly is fixed to the hand-held radio telephone. The antenna assembly includes a radiation absorber defining an open curved shape in cross section, so as to define an open transmission area. An antenna is disposed adjacent to the open transmission area so that during use of the hand-held radio telephone a first portion of a radiation signal emitted from the antenna is absorbed by the radiation absorber. A second portion of the radiation signal emitted from the antenna is transmitted through the open transmission area for reception by a remote receiver, such as a ground-based cell site or an orbiting satellite. To provide range enhancement of the transmitted signal from the inventive hand-held radio telephone, at least one parasitic radiation redirection element receives radiation emitted from the antenna. The radiation received by the parasitic radiation redirection element is directed toward the open transmission area, so as to extend a transmission range of the antenna assembly, and thus extend the transmission range of the hand-held radio telephone.

Preferably, an antenna housing is integrally formed with the hand-held radio telephone. The antenna assembly is mounted and fixed within the antenna housing so that during normal use of the hand-held radio telephone the open transmission area is disposed, relative to the antenna, in a direction away from the user. Furthermore, the radiation absorber is disposed, relative to the antenna, in a direction toward the user. Thus, the radiation signal emitted from the antenna that is not absorbed by the radiation absorber is transmitted through the open transmission area and in a direction of an orbiting satellite. By this construction, at least some of the radiation signal that is emitted from the antenna in directions toward the user is blocked by the radiation absorber from being transmitted to and absorbed by the user, and at least some of the radiation emitted from the antenna in directions toward the user is redirected and transmitted as an enhanced radiation signal. Thus, in accordance with the present invention, the inventive hand-held radio telephone has an antenna assembly capable of preventing unwanted exposure of the user to potentially harmful radiation, while providing an enhanced and extended transmission signal to enable improved communication.

Preferably, the antenna assembly has a longitudinal axis perpendicular to the cross section of the radiation absorber. The antenna assembly is mounted and fixed in the antenna housing so that the longitudinal axis, of the antenna assembly is perpendicular to a longitudinal axis of the hand-held radio telephone. The antenna assembly is disposed during use so that radiation transmitted through the open transmission area is directed up and away from the user. This construction and orientation of the antenna assembly is particularly suited for communication with a satellite in low earth orbit. The transmission signal is directed upward in directions where a clear line-of-sight is more likely to be available between the open transmission area and the orbiting satellite, thus making it much less likely that a ground-based feature, such as a building or mountain will attenuate the transmitted signal. The radiation absorber comprises a conductive material, or blocking agent, dispersed in a non-conductive binder matrix. The conductive material is any suitable material such as a conductive free metal, $FeO_2$, titanium oxide, ferromagnetic material include carbonyl iron or ferrite oxide mixed with other oxides or ferrites or garnet, and materials such as magnesium nickel, lithium, yttrium, and/or calcium vanadium. Preferably, the particle sizes of the blocking agents range from typically about four microns to about 20 microns. Various types of matrix binders may be used with the blocking agents. For example, silicone, epoxy, neoprene, ceramic or polyvinyl chloride are all satisfactory binder materials for the blocking agents.

The antenna assembly may include a support structure fixed to the radiation absorber. The radiation absorber preferably has a semicircular cross section having an arc length of at least 180 degrees to adequately prevent harmful exposure of the user to radiation emitted from the antenna. Also, a radiation blocking layer may be disposed between the antenna and the user to provide further security against unwanted exposure of the user to radiation emitted from the antenna. By this construction, a radio telephone is provided having an antenna assembly capable of preventing potentially dangerous exposure to radiation, while enabling an enhanced and extended transmission signal.

In accordance with another aspect of the present invention, an antenna assembly is provided for use with a radio signal transmitting device. The antenna assembly includes an antenna for transmitting a radio signal from the radio signal transmitting device. The radio signal is transmitted at a transmission side of the antenna assembly. The radio signal is blocked from transmission through a shielding side of the antenna assembly. A radiation absorber member is disposed at the shielding side and is disposed during use between the antenna and the user of the radio transmitting device. A first parsitic element is disposed during use between the antenna and the user. A second parasitic element is disposed at the transmission side and disposed during use so that the antenna is between the second parasitic element and the user. The first and second parasitic elements are disposed from the antenna at a gap distance effective to direct a portion of the radio signal toward the transmission side. A metal shell member is disposed at the shielding side, and disposed during use between the radiation absorber member and the user. The portion of the radio signal transmitted from the antenna is blocked at the shielding side to prevent exposure of the user to the radio signal. The radio signal is transmitted at the transmitting side for effective communication with a remote receiver. It is an object of the invention to protect users of radio equipment from electromagnetic radiation emitted from antenna assembly which is located in close proximity to the body of the user and especially in close proximity to the head of the user. Another object of the invention is to provide an antenna assembly that is effective for redirecting a radio signal that conventionally is absorbed by the body of the user in a direction away from the user, to thereby increase range performance of the radio system. The inventive antenna assembly can be used for hand-held communication devices, such as cellular telephones, or any other radio communication system.

BRIEF DESCRIPTION OF THE DRAWINGS

FIG. 29(*a*) show another embodiment of the inventive antenna assembly and mounting means;

FIG. 29(*b*) is an enlarged isolated view of a spring loaded pin mechanism in accordance with the embodiment of the inventive antenna assembly and mounting means shown in FIG. 29(*a*);

FIG. 30(*b*) is a cross sectional side view of the inventive antenna assembly shown in FIG. 29(*a*) disposed at an angle effective for communication with a ground-based cell site antenna;

FIG. 31(*b*) is a schematic view of the embodiment of the inventive hand-held radio telephone shown in FIG. 31(*a*) having the inventive antenna assembly and mounting means shown in FIG. 29(*a*) transmitting to a ground-based cell site antenna;

FIG. 33(*b*) is a cut-away cross-sectional view of the antenna assembly along line 33(*b*)—33(*b*) shown in FIG. 33(*a*);

FIG. 34(*b*) is a cut-away cross-sectional view of the antenna assembly along line 34(*b*)—34(*b*) shown in FIG. 34(*a*);

FIG. 35(*b*), is a cut-away cross-sectional view of the antenna assembly along line 35(*b*)—35(*b*) shown in FIG. 35(*a*);

FIG. 37(*b*) is a perspective view of the antenna assembly shown in FIG. 35(*a*);

FIG. 38(*b*),is an exploded view of the antenna assembly shown in FIG. 38(*a*);

FIG. 39(*b*) is an exploded view of the antenna assembly shown in FIG. 39(*a*);

FIG. 40(*b*) is a partial exploded view of the antenna assembly shown in FIG. 40(*a*) prior to installation in an assembly housing;

FIG. 40(*c*) is a perspective view of an assembled antenna assembly and assembly housing;

FIG. 41(*b*) is a perspective view of a radio transmitting device having an embodiment of the inventive dual antenna assembly;

FIG. 42(*b*) is a perspective view of the radio transmitting device shown in FIG. 42(*a*) having the inventive dual antenna assembly disposed in an open, in-use position;

FIG. 43(*b*) is a schematic view of the radio transmitting device shown in FIG. 43(*b*) having the inventive dual antenna assembly in a closed position;

FIG. 44(*b*) is a schematic view of an embodiment of the inventive antenna assembly disposed on a radio transmitting device.

DETAILED DESCRIPTION OF THE INVENTION

Figure 1:
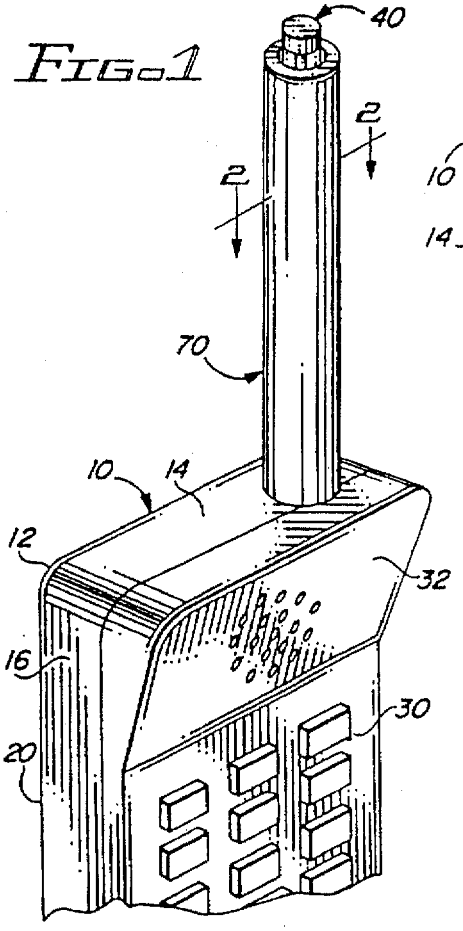
FIG. 1 is a perspective view of the apparatus of the present invention in its use environment.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

For purposes of illustrating the present invention, a portable telephone or wireless personal communication apparatus 10, and only a few portions of such apparatus are identified in the drawing and will be discussed. The same basic portable telephone or wireless personal communication apparatus 10 is shown with different antenna configurations and with different protective shield and microwave redirection and range extension embodiments in the drawing figures.

The telephone or personal communication apparatus 10 is shown as including a case 12 having a top 14. Two sides of the telephone or personal communication apparatus case 12 are shown, as a side 16 in FIG. 1 and a side 18 is FIGS. 3 and 8.

The telephone or personal communication apparatus 10 includes a front which has a key pad 30 in the upper portion of the apparatus and a speaker 32 in the upper portion. The telephone or personal communication apparatus 10 also includes a back 26, shown in FIG. 3.

FIG. 1 is a perspective view of the telephone or personal communication apparatus 10. The apparatus 10 is a hand-held, wireless telephone or personal communication apparatus, which may typically be a cellular telephone or other type of hand-held and/or cordless telephone or wireless personal communication apparatus. An antenna 40 extends upwardly from the top 14.

Figure 8:
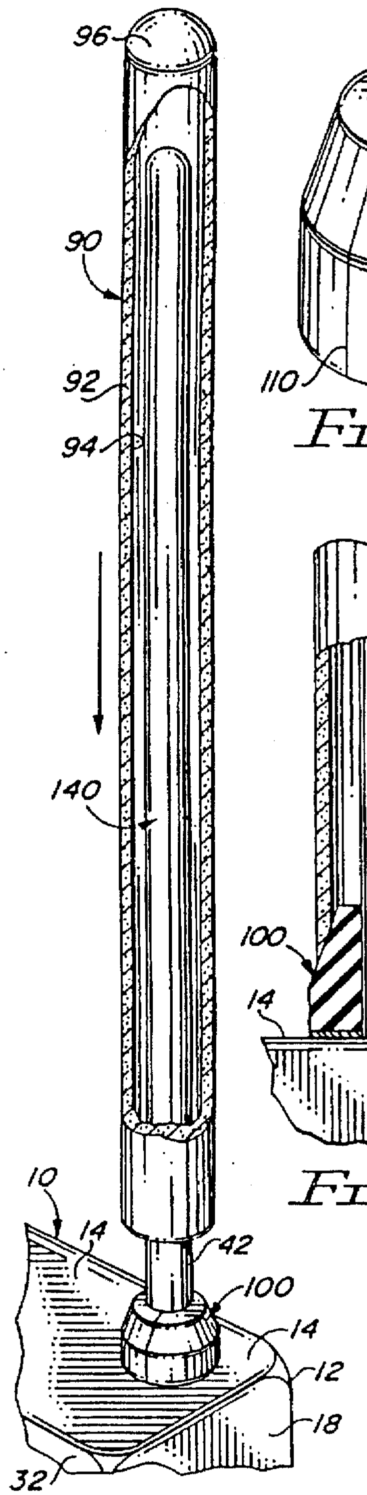
FIG. 8 is a perspective view, partially broken away, sequentially illustrating the operation of an alternate embodiment of the apparatus of the present invention with the element of FIG. 7.
Figure 9:
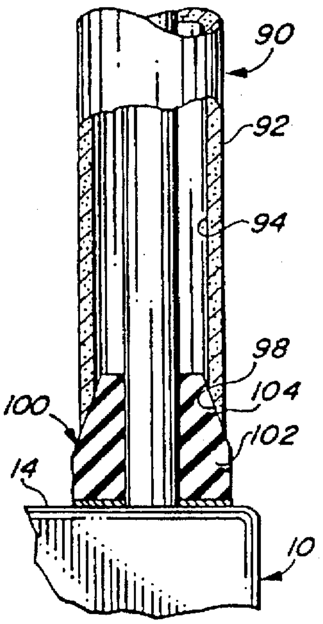
FIG. 9 is a sequential view illustrating the operation of the elements illustrated in FIGS. 7 and 8.

In FIGS. 1–6, the antenna 40 is shown as a telescoping antenna, such as typically used in portable telephones or wireless personal communication apparatus. Alternatively, the antenna may also be a fixed length antenna, such as typically used in cellular telephones, as shown in FIGS. 8 and 9.

With the same basic portable telephone or personal communication apparatus 10, and the same basic antenna 40, several different embodiments of shield apparatus are shown.

Figure 2:
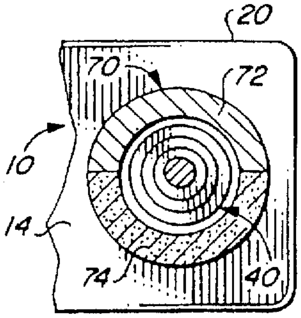
FIG. 2 is a view in partial section taken generally along line 2—2 of FIG. 1.

FIG. 2 is a top view of the telephone apparatus 10 of FIG. 1 taken generally along line 2—2 of FIG. 1. FIG. 2 shows the top 14 of the telephone or personal communication apparatus 10, with the antenna 40 disposed in a shield and microwave redirection and range extension apparatus 70. The shield apparatus 70 is shown in both FIGS. 1 and 2.

The shield and microwave redirection and range extension apparatus 70 is a generally cylindrical element, with the cylindrical element having two portions, an open portion 72 and an absorbing and microwave redirection portion 74. That is, there is a portion of the cylindrical shield 70 which is open to electromagnetic microwave radio frequency radiation. The portion 72 is the open portion in that microwave radio frequency radiation will pass through the portion 72 without any blocking or absorbing of the radiation.

However, the portion 74 is the absorbing and microwave radiation redirection portion and will absorb, block and redirect the radiation to shield the user of the telephone or wireless personal communication apparatus 10 from the potentially harmful effects of the microwave radio frequency radiation emanating from the antenna. In addition, the portion 74 extends the transmission range of the apparatus 10 by redirecting the microwave radiation away from the user.

It will be noted that the shield and microwave redirection apparatus 70 is of a limited or finite height. The antenna 40 is shown contained within the shield and microwave redirection apparatus 70. The height of the shield and microwave redirection apparatus 70 is typically set to protect the head of the user of the apparatus 10 while the telephone or wireless personal communication apparatus 10 is in use, and to extend the microwave radiation and transmission range of the apparatus.

Figure 4:
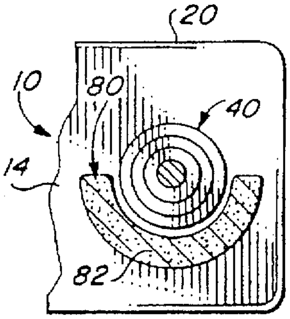
FIG. 4 is a view in partial section taken generally along line 4—4 of FIG. 3.
Figure 3:
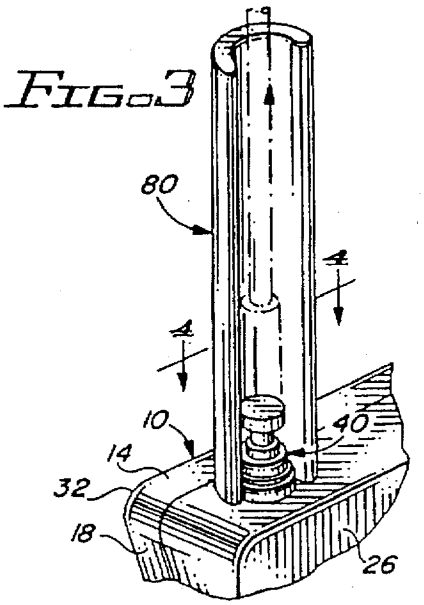
FIG. 3 is a perspective view of an alternate embodiment of the apparatus of FIGS. 1 and 2.

An alternate embodiment of the shield and microwave radiation apparatus 70 of FIGS. 1 and 2 is shown in FIGS. 3 and 4. The shield apparatus of FIGS. 4 and 5 comprises a shield and microwave redirection apparatus 80 secured to and extending upwardly from, the top 14 of the telephone or wireless personal communication apparatus 10.

Shield and microwave redirection apparatus 80 shown in FIGS. 3 and 4 comprises only a segmental blocking shield and microwave redirection apparatus 82 disposed between the user of the apparatus, whose head will be adjacent to the speaker portion 32 during use, and the antenna 40. With the shield 82 being only a segmental portion, the antenna is free from any type of obstruction on the opposite side of the shield apparatus 80, or remote from the user of the apparatus.

Figure 5:
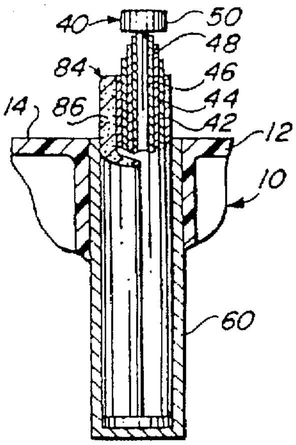
FIG. 5 is a side view in partial section of an alternate embodiment of the present invention.
Figure 6:
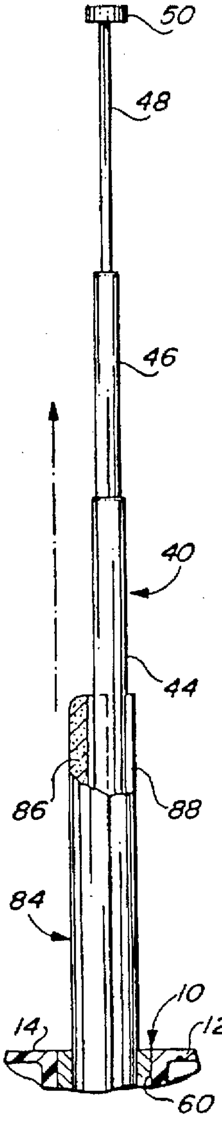
FIG. 6 is a side view in partial section illustrating the functioning of the antenna apparatus associated with the present invention.

FIGS. 5 and 6 illustrate sequential views of the antenna 40 in use with another alternate shield and microwave redirection apparatus embodiment 84.

In FIG. 5, the telephone or wireless personal communication apparatus 10 is shown with an antenna well 60 which extends downwardly from the top 14 of the case 12. In the art, it is well known and understood that an antenna, such as the antenna 40, may be made of a segment or of concentric segments which may be retracted into a well within the telephone or personal communication apparatus. The antenna is extended, and the segment and/or segments extend upwardly and outwardly as they are pulled out by the user of the telephone or personal communication apparatus.

In FIG. 5, the well 60 is shown with the antenna 40 in its down or collapsed or telescoping orientation within the well. In FIG. 6, the antenna 40 is shown extending outwardly from the case 12 and outwardly from the antenna well 60. It will be noted that the electrical connections, well known and understood in the art, have been omitted from both FIGS. 5 and 6.

The shield and microwave redirection apparatus 84 is shown in FIG. 5 extending downwardly into the well 60 and accordingly surrounding the bottom of the antenna 40. The antenna 40, as shown, includes four telescoping segments, an outer bottom segment 42, a first inner segment 44, a second inner segment 46, and a third and innermost segment 48. A button 50 is secured to the top of the innermost segment 48.

With the antenna 40 in its down or nesting orientation, as illustrated in FIG. 5, the shield apparatus 84 is disposed almost entirely within the well 60 and about the antenna. With the extension of the antenna 40, as shown in FIG. 6, the shield and microwave redirection apparatus 84 is moved upwardly with the antenna segments as the antenna is raised. The shield and microwave redirection apparatus 84 is disposed about the lower portions of the antenna, namely the segments 42 and 44 and accordingly protects the user from the radiation and redirects the microwave radiation away form the user.

The shield 84 includes two portions, a blocking or shield and microwave redirection portion 86, which is directed toward the user of the telephone apparatus 10, and an open portion 88, which is directed away from the user and through which radio frequency radiation passes without absorption. The blocking or shield and microwave redirection portion 86 absorbs and redirects the microwave radiation away from the user of the apparatus 10.

Figure 7:
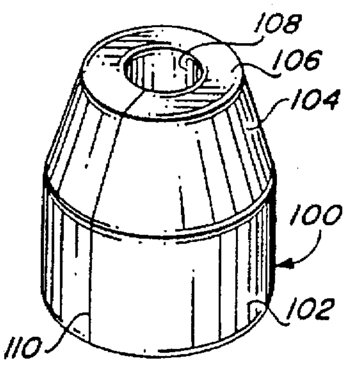
FIG. 7 is a perspective view of an element which comprises an alternate embodiment of the apparatus of the present invention.

FIGS. 7, 8 and 9, illustrate another embodiment of the shield and microwave redirection apparatus of the present invention. FIG. 7 is a perspective view of a washer 100 which is disposed about the bottom of an antenna 140 and on the top surface 14 of the telephone or personal communication case 12. The washer 100 is used to secure a fixed shield and microwave redirection sheath 90 to the antenna 140. It will be noted that, with the shield apparatus 90 and its washer 100, the antenna 140 must be raised to its up position and must remain there within the shield and microwave redirection sheath 90. If the telephone or wireless personal communication apparatus is a cellular phone with a fixed antenna, then there is no problem of inconvenience due to the inability to retract the antenna.

Essentially, the alternate embodiment 90 comprises a universal blocking and microwave redirection element which may be fitted to a number of different portable or cellular telephones or personal communication apparatus. Typically, the shield apparatus 90 will be fitted to a cellular telephone or wireless personal communications apparatus having a fixed antenna.

The alternate embodiment 90 includes a shield and microwave redirection sheath 92 which is generally of a cylindrical configuration. There is an inner bore 94 within the sheath 92. The sheath 92 and the bore 94 are closed by a top 96. At the bottom of the sheath 92 is a tapered portion 98, best shown in FIG. 9. The tapered portion 98 is disposed against, and appropriately secured to, the washer 100.

FIG. 7 is a perspective view of the washer 100. FIG. 8 is a perspective view of the portable telephone or wireless personal communication apparatus 10, with the washer 100 disposed about the bottom of the antenna 140, and the antenna 140 is shown raised to its highest or uppermost open position. FIG. 9 is a side view in partial section showing the washer 100 secured to the top 14 of the telephone or wireless personal communication apparatus 10, and the sheath 92 is shown secured to the washer 100.

Note that the antenna 140 is a fixed length antenna, and not telescoping.

The washer 100, perhaps best shown in FIG. 7, includes a lower cylindrical portion 102 with an upper tapering portion 104. The tapering portion 104 extends from the lower cylindrical portion 102 to a top 106. A bore 108 extends through the washer 100 from the top 106 to the bottom of the washer. A radially extending slot 110 extends through the washer, including through both the lower bottom cylindrical portion 12 and the upper tapering portion 104.

For securing the washer 100 to the top 14, and about the lower portion of the antenna 140, the washer 40 is opened at the slit 110 and the washer is then fitted about the lower portion 42 of the antenna 40. The bottom of the washer 100 is placed on the top 14, and may be adhesively secured thereto.

The sheath 92 is placed over the antenna. The bottom tapering portion 98 of the sheath 92 is disposed against the tapering wall or portion 104 of the washer 100. The tapering portion 98 at the bottom of the sheath 92 matches the taper 104 of the washer 100. If desired, the sheath 92 may be adhesively secured to the washer 100. The shield and microwave redirection apparatus 90 accordingly becomes a relatively permanent part of the telephone or wireless personal communication apparatus 10.

The shield and microwave redirection apparatus 90 includes a blocking and microwave redirection portion and an open portion, such as discussed above. The blocking and radiation redirection portion is disposed adjacent to, or in the direction of, the speaker portion 32 of the telephone or personal communication apparatus 10, and accordingly in the direction or towards the user of the telephone or personal communication apparatus. The “open” portion is directed away from the user.

The washer 100 may preferably also include two portions, again a blocking and microwave redirecting portion which is oriented towards the user and an unblocked or open portion which is directed away from the user to allow the transmitted electromagnetic radiation from the antenna 140 to radiate or flow outwardly therefrom.

Returning again to FIGS. 2, 3 and 4, the blocking and radiation redirection portions of the shields discussed above are shown as comprising an arcuate extent of about 180 degrees. It may very well be that a lesser arcuate extent will be just as effective in blocking the potentially harmful radiation from the antenna 40 (and also from the antenna 140), and from associated portions of the telephone or wireless personal communication apparatus 10. For example, it may be that an arcuate length of only about 120 degrees, or even perhaps less, is necessary. On the other hand, it may be that a full 180 degrees, or more, is necessary for effective radiation protection.

Referring again to FIG. 5, the shield and microwave redirection portion 84 is shown extending down into the antenna well 60. If desired, the shield, or particularly the absorption, blocking and microwave radiation redirection portion thereof, may permanently extend down into the well about the antenna and may also be disposed between the user of the telephone or wireless personal communication apparatus and any other portions within the case 12 which may discharge electromagnetic radiation.

Similarly, radiation blocking or absorbing portions may also be disposed about the case 12 where a user typically holds on to the hand set, or wireless personal communication apparatus, if desired. In such case, the blocking and/or absorption materials would provide a shield for the hand of the user as the user holds the telephone or personal communication apparatus.

Figure 10:
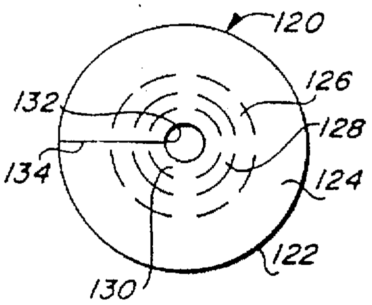
FIG. 10 is a top plan view of an alternate embodiment of the radiation shield and microwave redirection and range extension apparatus of the present invention.

FIG. 10 is a top view of an alternate embodiment of the washer apparatus 100. FIG. 10 comprises a top view of washer apparatus 120 which is a generally universal type washer.

Since the diameter of an antenna varies from one telephone or personal communication apparatus to another, the washer apparatus 100 has been configured to fit a wide range of telephone or personal communication apparatus antennae. The washer apparatus 120 includes a cylindrical portion 122, which is substantially identical to the cylindrical portion 102. From the cylindrical portion, there is an upwardly extending tapering portion 124 which extends upwardly to the top of the washer. There are three concentric rings, including an outer concentric ring 126, a middle concentric ring 128, and an inner concentric ring 130. The inner concentric ring 130 includes an inner bore 132. A slot 134 extends through the washer 120, including through the lower cylindrical portion 122, the tapered portion 124, and through all three of the concentric rings 126, 128 and 130, from the inner bore 132 radially outwardly.

The concentric rings 126, 128 and 130 are scored at their outer peripheries to allow them to be removed, as desired, to provide an inner diameter for the washer apparatus 120 which will fit reasonably snugly against the outer diameters of antennae of various sizes.

The bore 132 of the inner ring 130 is configured to fit the smallest antenna, while the removal of all three of the concentric rings will leave a bore which is substantially the same as the outer diameter of the largest of the known antennae. Thus, the washer 120 may be sold with the sheath 92 to fit virtually all antennae in use with various types of hand-held telephones or personal communication apparatus.

Figure 11:
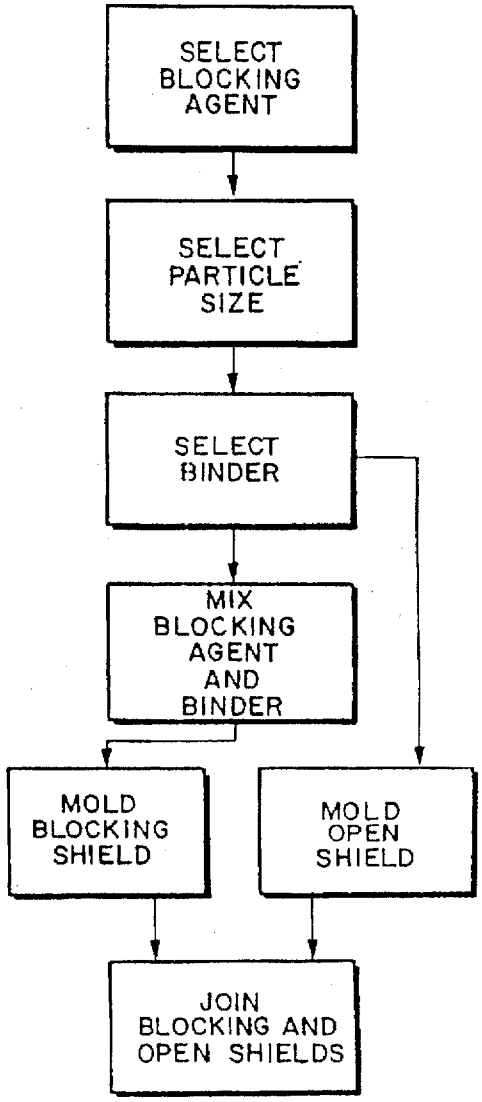
FIG. 11 is a block diagram illustrating the fabrication of the apparatus of the present invention.

FIG. 11 comprises a block diagram illustrating the fabrication of the absorption, blocking, and microwave redirection shields discussed above. Essentially, the shields are made of a binder or base carrier product that blocking agents will be mixed with. There are different types of blocking agents which form radiation or wave absorption materials. Relatively popular, ferromagnetic material include carbonyl iron or ferrite oxide mixed with other oxides or ferrites or garnet, and materials such as magnesium nickel, lithium, yttrium, and/or calcium vanadium. The particle sizes of the blocking agents range from typically about four microns to about 20 microns. The particle size and ferrite content of the mixture depends generally on the frequency of the radiation to be blocked.

Various types of binders may be used with the blocking agents. For example, silicone, epoxy, neoprene, or polyvinyl chloride are all satisfactory binder materials for the blocking agents.

Sequentially, the frequency range of the radiation to be blocked is first determined. After the frequency range is determined, the desired absorption and blocking agent and/or agents and a particle size and/or sizes for the absorption and blocking agent is selected. The absorption and blocking agent is then mixed with the appropriate binder.

If a full 360 degree shield is used, such as shown in FIGS. 1, 2, 5, 6, 8 and 9, then the sheath will be made in two parts, a part which includes the absorption and blocking material and a part that is free of the absorption and blocking material, but only includes the binder. The two portions will then be appropriately joined together to define a full 360 degree sheath. When only a segmental shield is to be used, such as shown in FIGS. 4 and 5, then the extra, blocking free binder portion need not be made.

Figure 12:
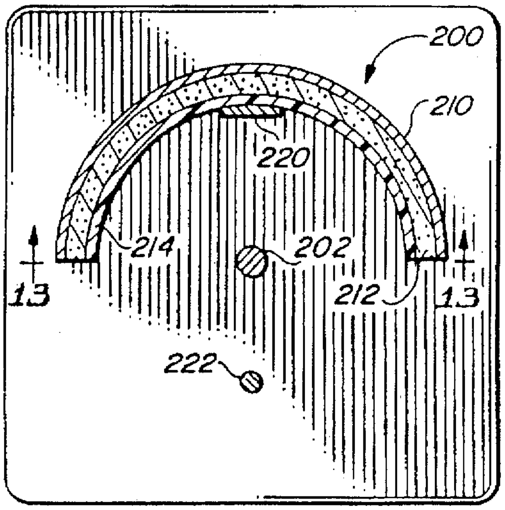
FIG. 12 is a top view of an alternate embodiment of the radiation shield and microwave redirection and range extension apparatus of the present invention.
Figure 13:
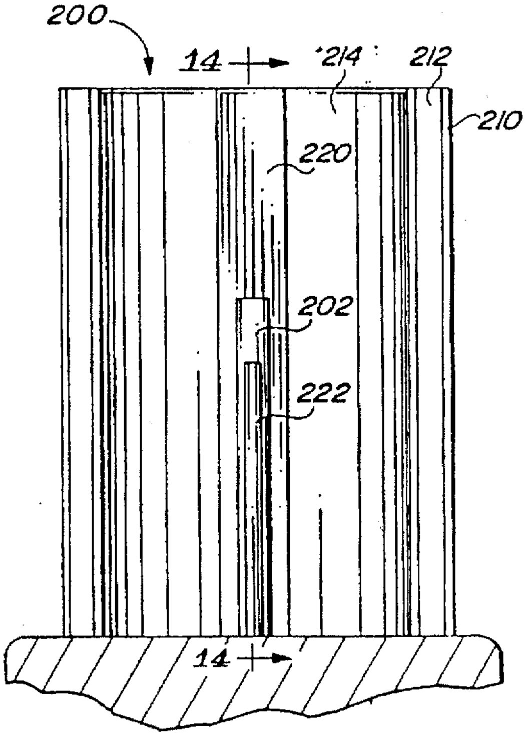
FIG. 13 is a side view of the apparatus of FIG. 12.
Figure 14:
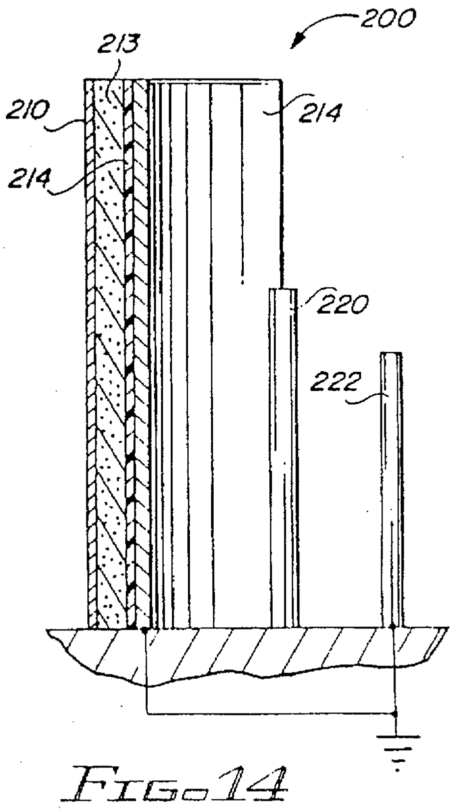
FIG. 14 is a view in partial section taken generally along line 14—14 of FIG. 13.
Figure 15:
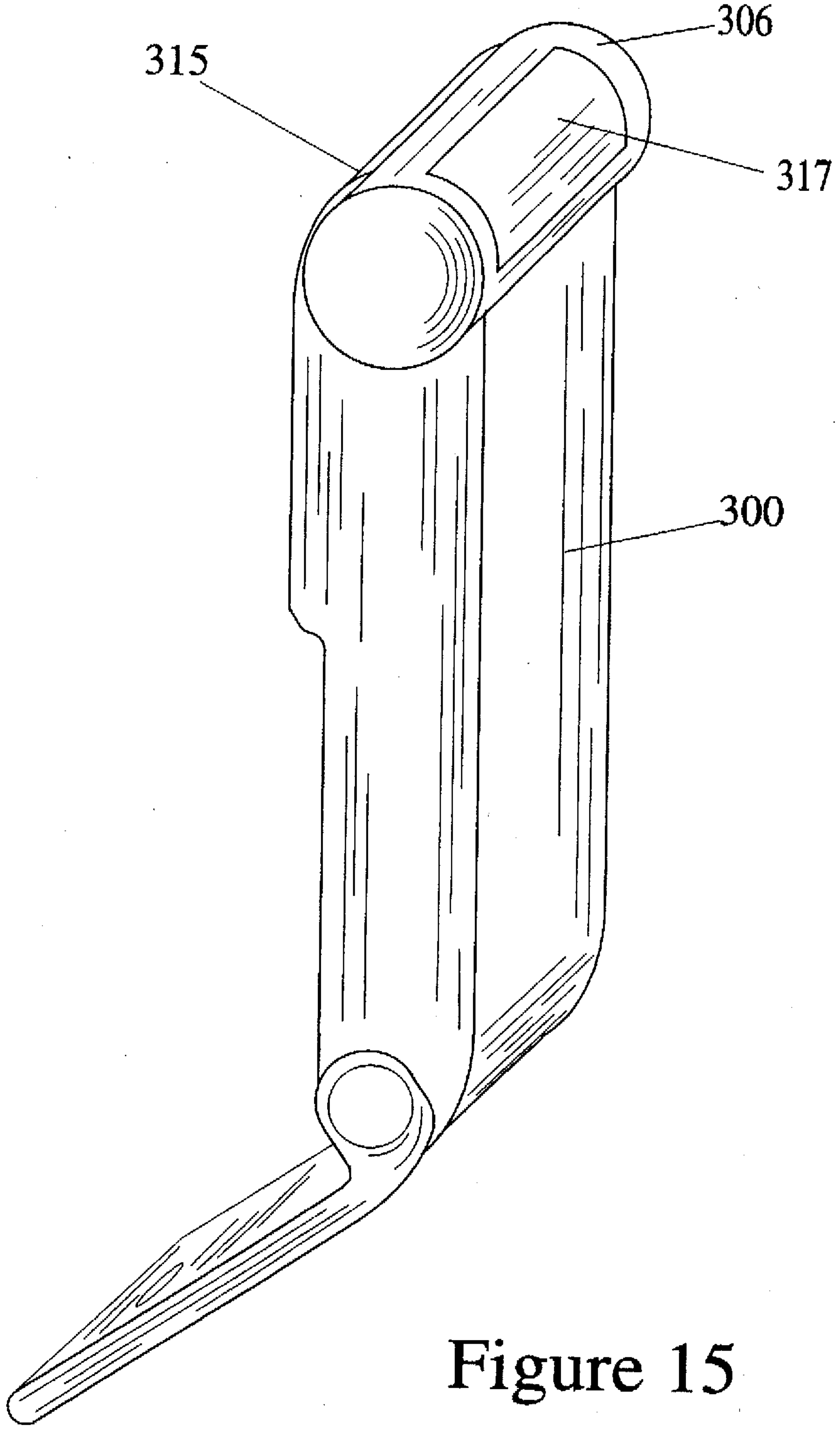
FIG. 15 is a perspective view of a hand-held radio telephone in accordance with the present invention.

FIG. 12 comprises a top view schematically illustrating an alternate embodiment of the shield apparatus of the present invention, comprising shield apparatus 200. FIG. 13 is essentially a front of the apparatus 200, taken generally along line 13—13 of FIG. 12. FIG. 14 is a side view in partial section of the shield apparatus 200, taken generally along line 14—14 of FIG. 13.

For the following discussion, reference will be made to FIGS. 12, 13 and 14.

The shield apparatus 200 is illustrated as a semicircular elongated element disposed about an antenna 202 for an arcuate distance of about 180 degrees. The antenna 202 is disposed at about the diameter of a circle of which the shield apparatus 200 comprises a semicircular portion. The shield apparatus 200 includes, with respect to the semicircular portion, three elements, an outer metallic shield 210, a ferromagnetic or non-microwave ferrite material layer 212 disposed against the outer shield layer 210, and an inner lining layer 214. The purpose of the inner lining layer 214 is merely to hold the ferrite material layer 212 in place against the outer shield 210.

One or two metallic parasite and microwave redirection elements, including a plate 220 which comprises an inner element, and an outer element 222, may each be employed separately or together and are shown aligned with the antenna 202. The elements 220 and/or 222 help to redirect the electromagnetic radiation emitted by the antenna 202 away from the user of the apparatus 200 and thus to extend the transmission range of the communications apparatus with which the shield 200 is being used.

When the outer element 222 is used, a line extending from the outer element 222, through the center of the antenna 202, bisects the plate 220, and also bisects the shield layers 210 and 212.

The inner parasitic element 220 comprises a flat plate appropriately secured to the inner lining 214. As best shown in FIGS. 13 and 14, the overall height of the inner parasitic element 220 is substantially the same as the outer shield 210 and the magnetic material layer 212.

The height of the antenna 202 is substantially less than the height of the parasitic element 220 and the shield layers 210 and 212. When used, the height of the outer parasitic element 222 is somewhat less than the height of the antenna 202. The relative heights may be understood from FIGS. 13 and 14.

As illustrated in FIG. 14, when employed together, the parasitic elements 220 and 222 are appropriately electrically connected together and extend to a circuit ground.

Figure 16:
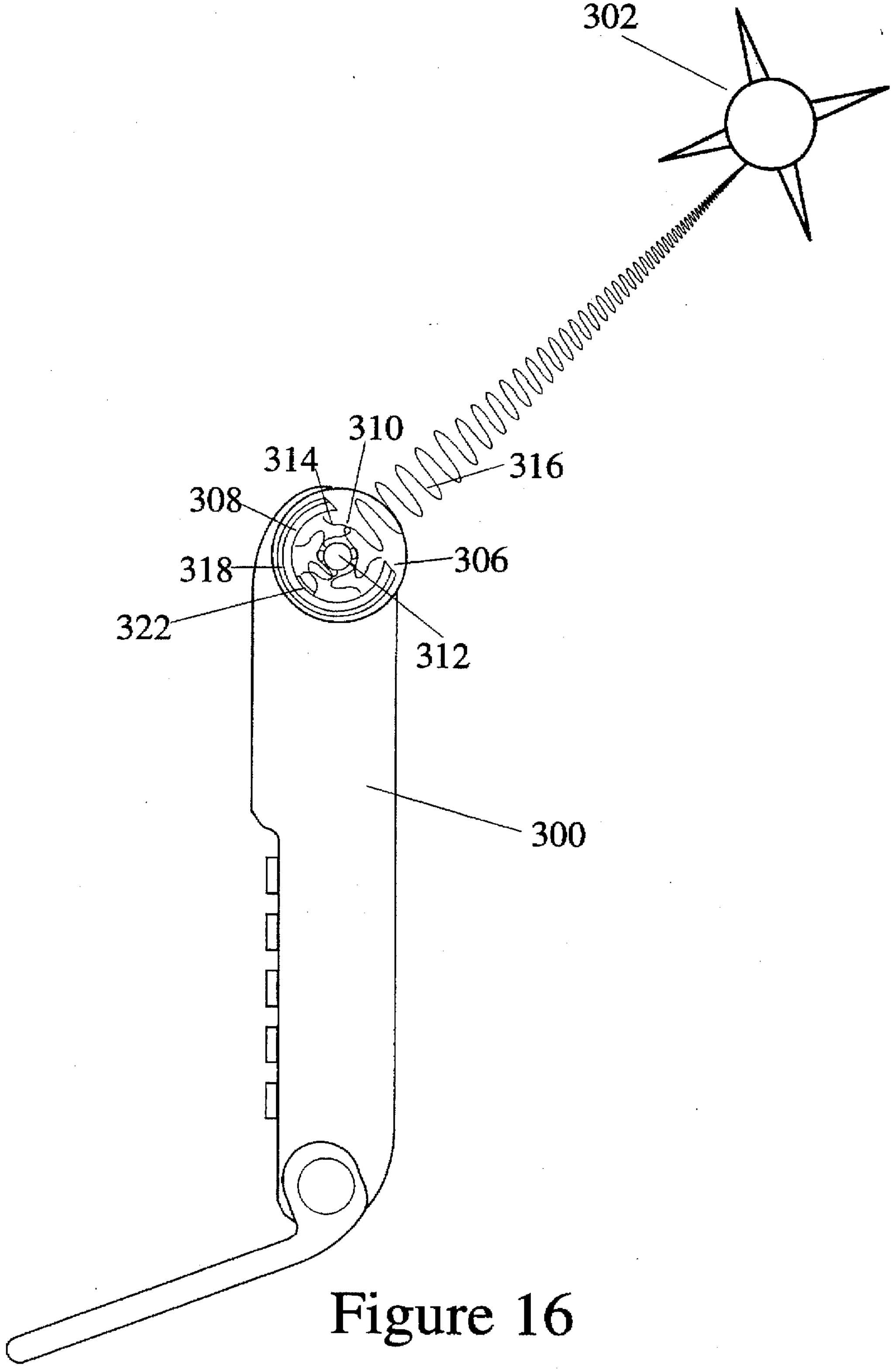
FIG. 16 is a schematic view of the inventive hand-held radio telephone transmitting to an orbiting satellite.

Referring now to FIGS. 15–28, an embodiment of an inventive hand-held radio telephone 300 having radiation shielding and signal range enhancement features is shown. This embodiment of the inventive hand-held radio telephone 300 is configured for radio communication through a remote receiver, and is particularly suited for communication via an orbiting satellite 302 (shown in FIG. 16) positioned in Earth orbit. With this form of radio communication, a radiation signal is emitted from the antenna 312 of the hand-held radio telephone 300 and the signal is transmitted to an orbiting satellite 302, where it is bounced or re-transmitted to an earthbound receiving station, usually at a .remote distance from the hand-held radio telephone position. The signal is then sent from the earthbound station to a hardwire communications network, such as conventional telephone lines, or via radio signals to another receiver.

Figure 32:
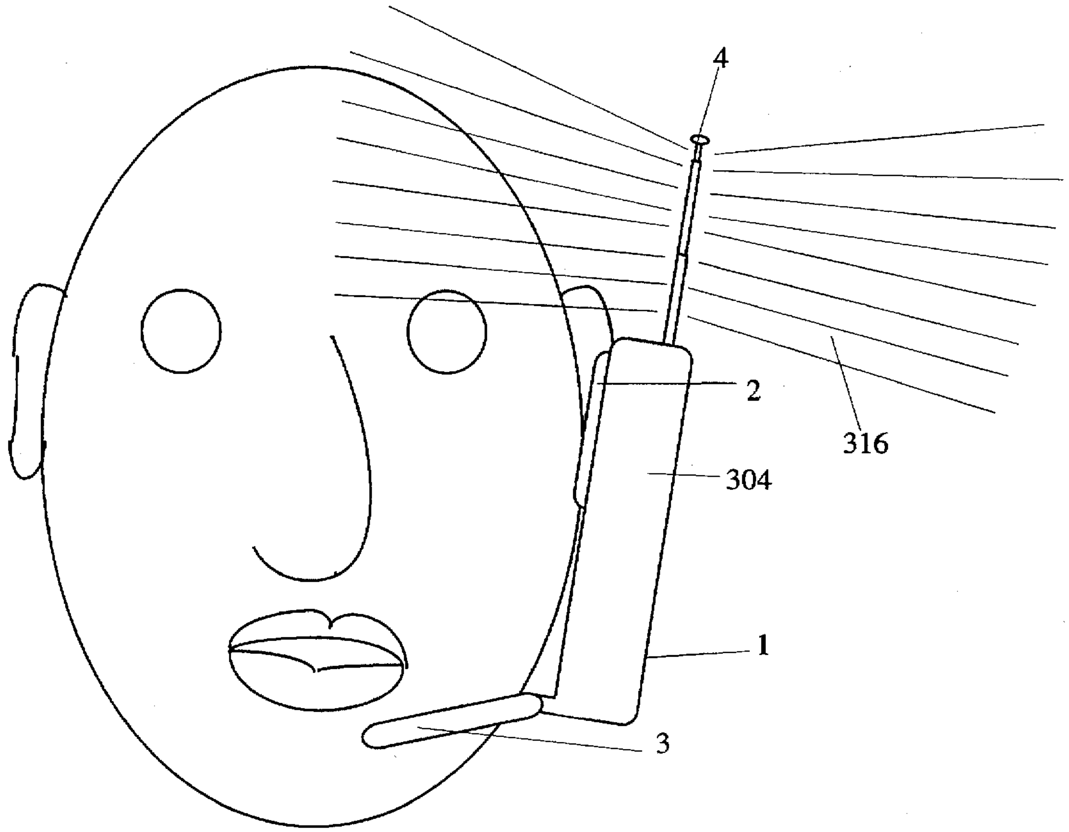
Figure 32 Prior Art
FIG. 32 shows a prior art conventional cellular telephone in use.

As shown in FIG. 32, a conventional cellular telephone 1, utilizing a conventional antenna configuration, transmits a radiation signal in directions which include the directions toward the head and body of the user. The transmitted radiation signal received by the head of the user has been shown to have detrimental effects and possibly cause tumors and other abnormalities in the head and body tissue of the user. Accordingly, the present inventive telephone has been devised having radiation shielding capabilities, and having signal range extension features.

Figure 17:
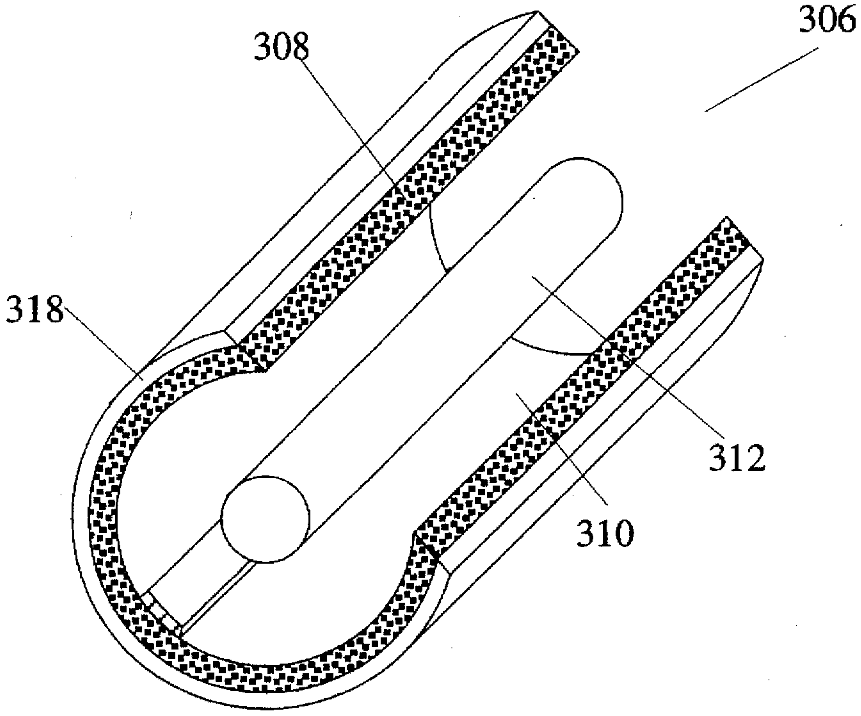
FIG. 17 is an isolated perspective view of the inventive antenna assembly.
Figure 18:
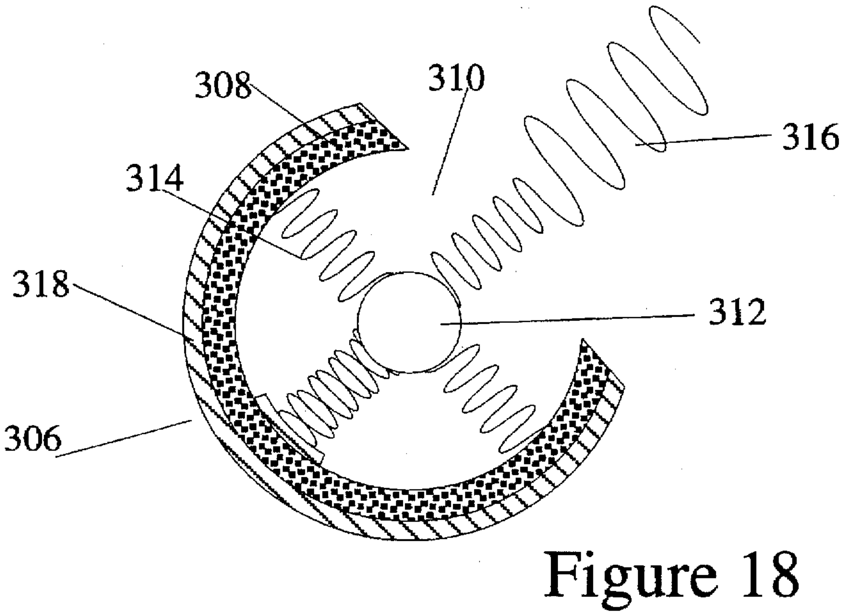
FIG. 18 is a cross sectional side view of the inventive antenna assembly shown in FIG. 17.
Figure 19:
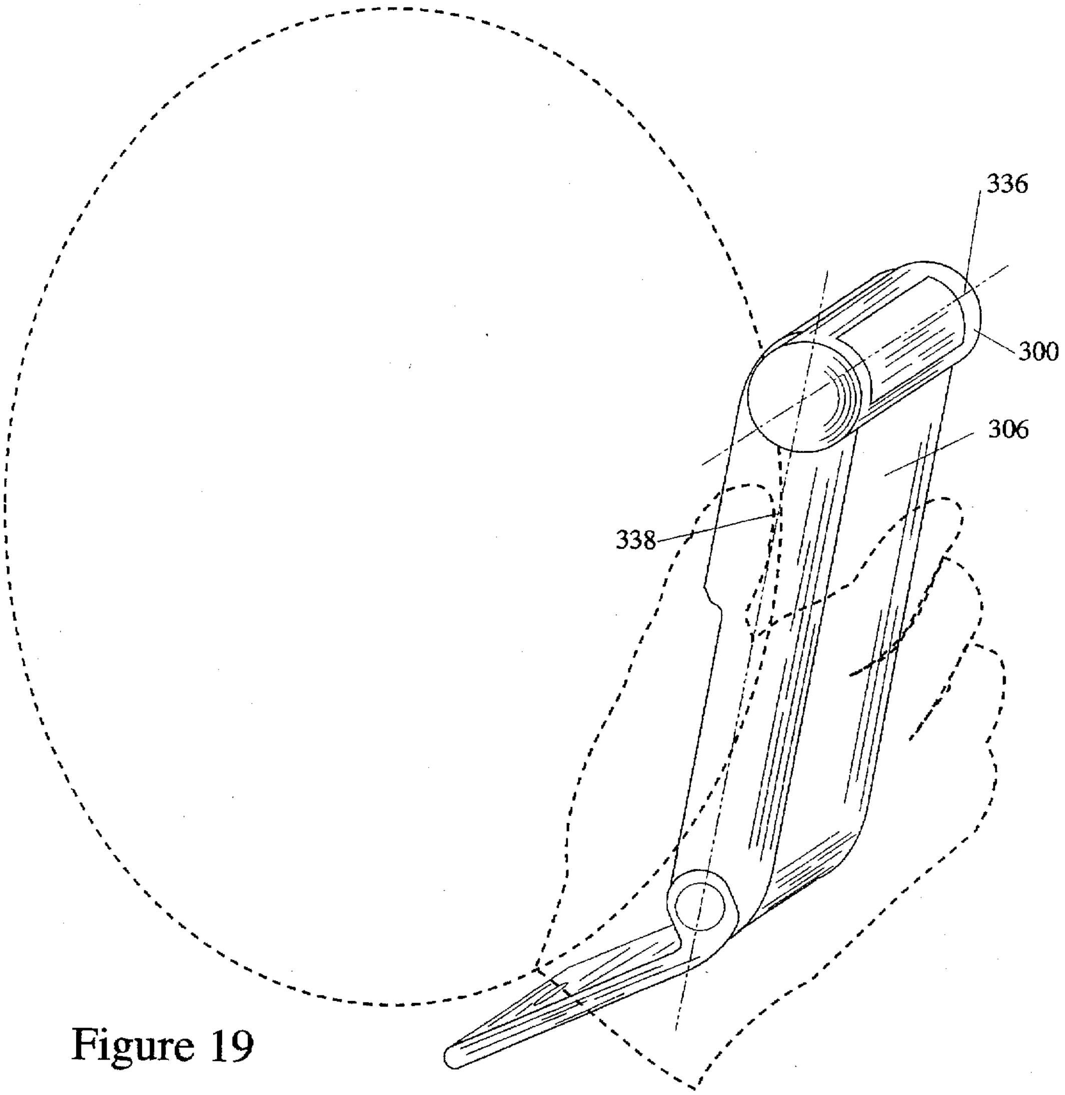
FIG. 19 schematically shows the inventive hand-held radio telephone disposed as in use.

Referring to FIGS. 15, 16, 17 and 18, the components of the inventive hand-held radio telephone 300 for radio communication through an orbiting satellite 302 are shown. An antenna assembly 306 is mounted and fixed within an antenna housing 315 that is integrally formed with the inventive hand-held radio telephone 300. A radiation-transparent window 317 may be provided for protecting the antenna assembly 306 from damage, while allowing for the transmission and reception of radiation signals. The antenna assembly 306 includes a radiation absorber 308. The radiation absorber 308 defines an open curved shape in cross section (shown in FIG. 18) so as to define an open transmission area 310. An antenna 312 is disposed adjacent to the open transmission area 310 so that during use of the hand-held radio telephone 300, a first portion 314 of a radiation signal emitted from the antenna 312 is absorbed by the radiation absorber 308. A second portion 316 of the radiation signal emitted from the antenna 312 is transmitted through the open transmission area 310 for reception by a remote receiver such as an orbiting satellite 302. The antenna assembly 306 is mounted and fixed in the hand-held radio telephone 300 so that during normal use the open transmission area 310 is disposed, relative to the antenna 312, in a direction away from the user, and the radiation absorber 308 is disposed, relative to the antenna 312, in a direction toward the user (as shown in FIG. 19). Thus, the second portion 316 of the radiation signal is transmitted through the open transmission area 310 of the antenna assembly 306, and is transmitted in a direction which is up and away from the user, and toward an orbiting satellite 302. At least some of the first portion 314 of the radiation signal is blocked from being transmitted to the user by the radiation absorber 308.

Stated otherwise, in accordance with the present invention, the radiation signal emitted from the antenna 312 and transmitted by the inventive hand-held radio telephone 300 is directed away from the user and in a direction toward a satellite 302 positioned in earth orbit. Thus, the hand-held radio telephone 300 is able to communicate via the orbiting satellite 302 with other telephone or radio communication systems that are also linked to the orbiting satellite 302. The potentially harmful radiation emitted from the antenna 312 in directions toward the user is blocked and absorbed by the radiation absorber 308. By this construction and orientation of the antenna assembly 306, the inventive hand-held radio telephone 300 is capable of effective communication, while the user is protected from the harmful effects of the radiation emitted by the antenna 312. Further, as shown in FIGS. 17 and 18, a support structure 318 may be provided to maintain the integrity and shape of the radiation absorber 308. The support structure 318 may be a metal member, having substantially the same shape as the radiation absorber 308 thereby acting as a supporting shell encasing the radiation absorber 308.

Figure 20:
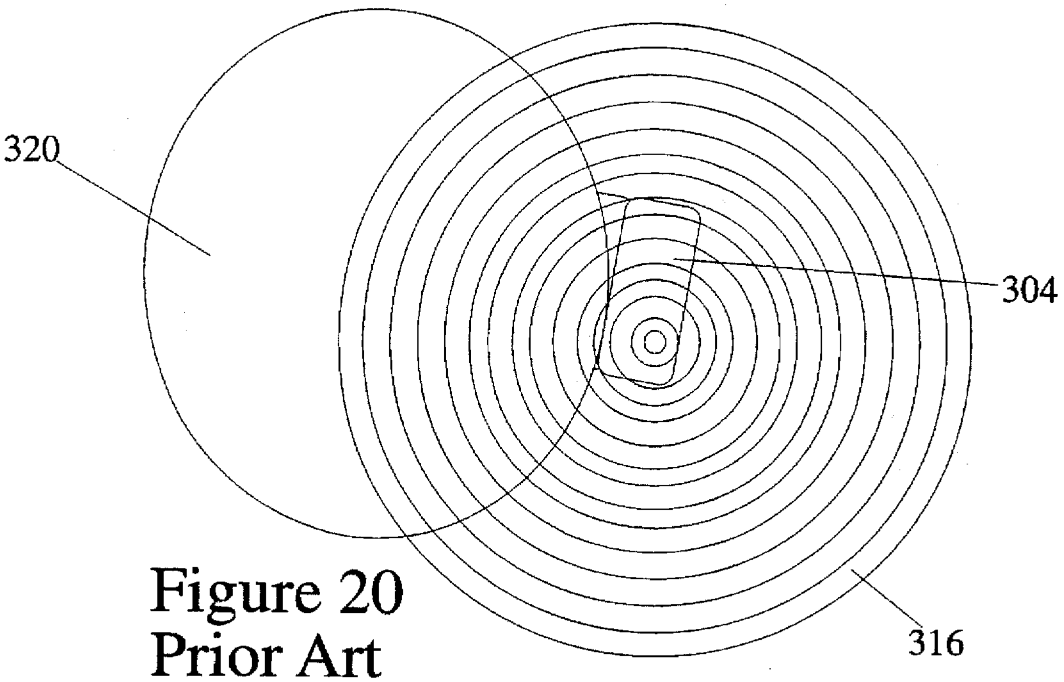
Figure 20 Prior Art
FIG. 20 shows the transmitted radiation pattern of a conventional cellular telephone.

FIG. 20 schematically shows a conventional cellular telephone 1 in use. This view shows the top of the user's head 320 and the top of the conventional cellular telephone 1. As shown, the conventional cellular telephone 1 emits a transmitted radiation pattern in all directions, with some of the transmitted radiation impinging on and being transmitted into and absorbed by the head of the user. The radiation which is absorbed by the body of the user is believed to have detrimental effects on the body tissue, and in particular, on the user's brain tissue. During use, the user's head 320 is in very close proximity to, if not touching, the radiation source (antenna) of the conventional cellular telephone 1. Recent evidence has shown that this proximity to the radiation source creates potential health hazards, since the radiation is not conventionally prevented from being absorbed by the head of the user. Also, the radiation that is absorbed by the head of the user is ineffective for communication, and thus attenuates the signal transmitted by the cellular telephone and received by a remote receiving unit, such as a ground-based cellular phone site or an orbiting antenna.

Figure 21:
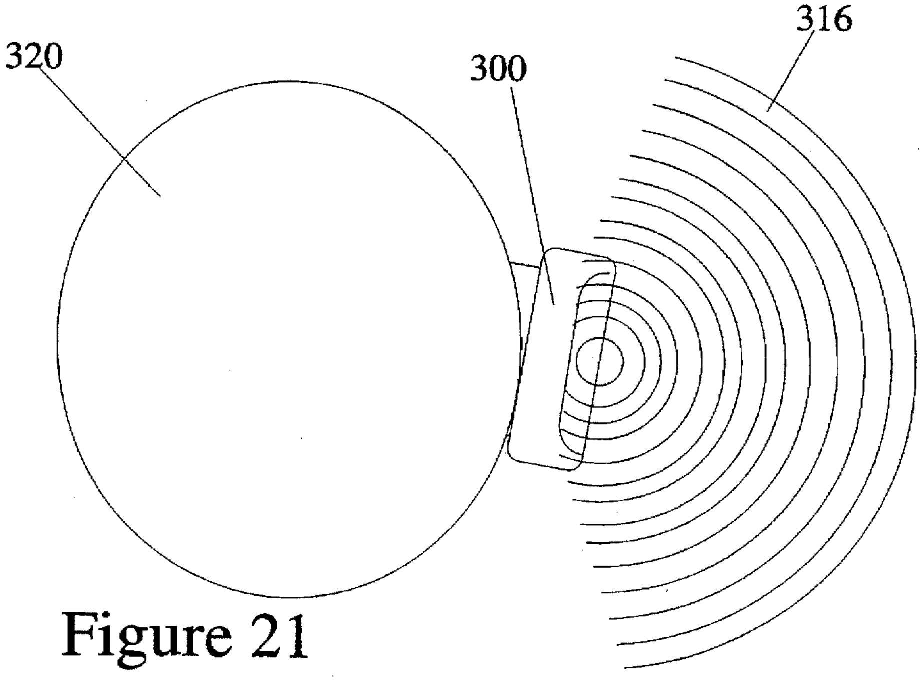
FIG. 21 shows the transmitted radiation pattern in accordance with the inventive hand-held radio telephone.

As shown schematically in FIG. 21, on the other hand, in accordance with the present invention, the inventive hand-held radio telephone 300 includes an antenna assembly 306 that effectively directs the transmission of radiation away from the user, while blocking and absorbing radiation emitted in directions towards the user. Thus, as shown, the transmitted radiation pattern of the cellular telephone in accordance with the present invention does not result in the absorption of the potentially hazardous radiation by the head and body parts of the user.

Figure 22:
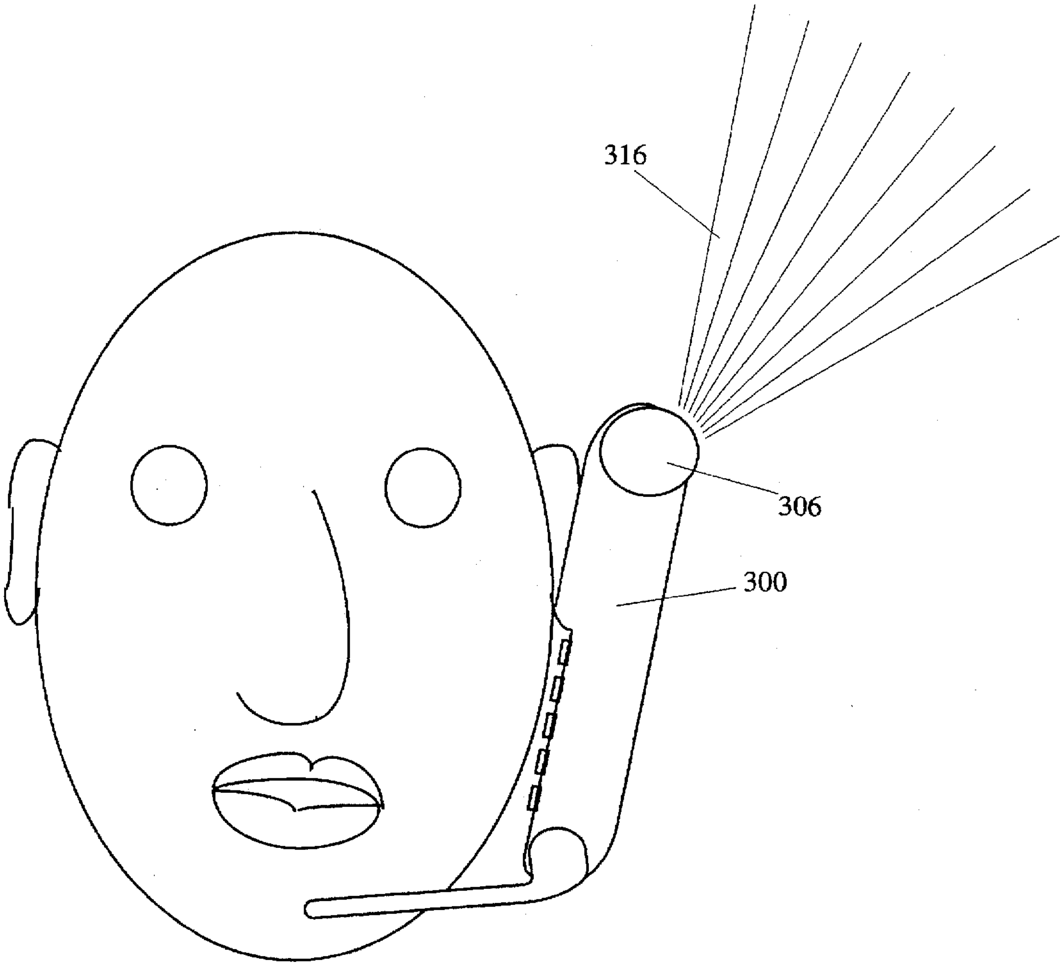
FIG. 22 shows the inventive hand-held radio telephone in use.

FIG. 22 shows the inventive hand-held radio telephone 300 in use. As shown, the user places the inventive radio telephone 300 so that the ear piece of the inventive hand-held radio telephone 300 is against the user's ear, and the mouth piece is positioned close to the user's mouth, in a similar fashion as the use of a conventional cellular telephone 1 (shown, for example, in FIG. 32). However, unlike a conventional cellular telephone 1 which emits radiation in directions towards the head of the user, in accordance with the present invention, the transmitted radiation 316 is directed up and away from the user so as to be effective for communication with an orbiting satellite 302, while preventing harmful exposure to the user of the emitted radiation from the antenna 312. Also, as described in more detail below, in accordance with the present invention, an enhanced signal is directed toward the orbiting satellite 302, or other receiver such as a ground based cell site antenna, thus providing for range enhancement capabilities of the inventive hand-held radio telephone 300 as compared with the conventional art.

Referring again to FIGS. 16, 17 and 18, in accordance with the present invention, the strength of the signal emitted by the antenna assembly 306 of the inventive hand-held radio telephone 300 is enhanced through the use of at least one parasitic radiation redirection element 322. The construction is similar to that shown, for example, in FIGS. 12, 13 and 14. The parasitic radiation redirection element 322 receives radiation emitted from the antenna 312, and redirects the received radiation towards the open transmission area 310 so as to extend the transmission range of the transmitted signal. Thus, as shown in FIG. 18, the radiation which may otherwise be transmitted toward and absorbed by the body tissues is received by the parasitic radiation redirection element 322 is redirected towards the open transmission area 310 to thereby increase the effective signal strength of the transmitted radiation 316 directed towards the orbiting satellite 302. In accordance with this feature, in addition to preventing unwanted and potentially harmful exposure to radiation by the user, the inventive hand-held radio telephone 300 also has enhanced transmission capabilities.

Figure 23:
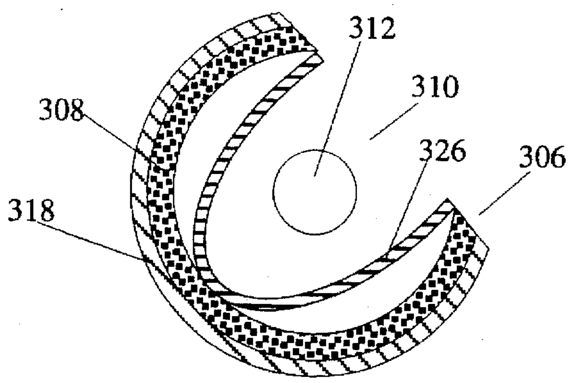
FIG. 23 shows an alternative configuration of the inventive antenna assembly.

As shown in FIG. 23, in accordance with another configuration of the inventive antenna assembly 306, a parabolic radiation reflection element 326 may be disposed adjacent to the antenna 312 for reflecting radiation emitted from the antenna 312 back towards the open transmission area 310 so as to extend the transmission range of the antenna assembly 306. The parabolic radiation reflection element 326 is configured and oriented so that radiation which may otherwise be transmitted towards the user and absorbed by the body tissues, is reflected and directed toward the open transmission area 310 so that the transmitted radiation signal directed towards the orbiting satellite 302 is enhanced and the transmission range is extended.

Figure 24:
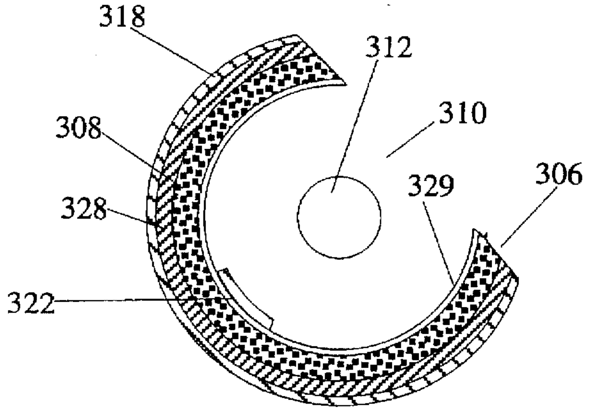
FIG. 24 shows another alternative configuration of the inventive antenna assembly.
Figure 25:
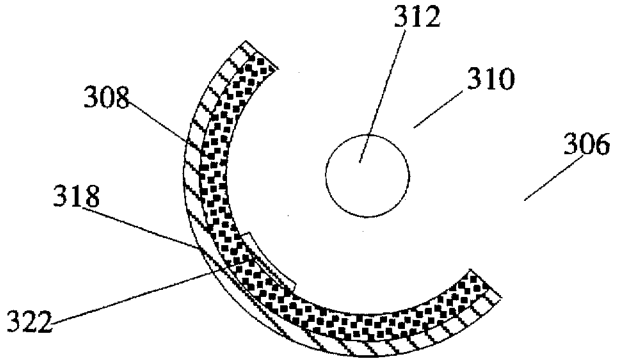
FIG. 25 shows another alternative configuration of the inventive antenna assembly.
Figure 26:
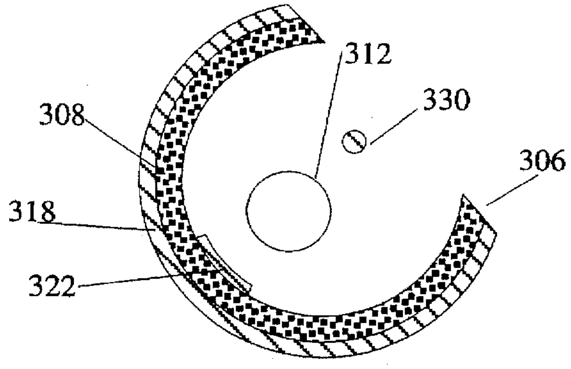
FIG. 26 shows another alternative configuration of the inventive antenna assembly.

As shown in FIG. 24, a radiation blocking layer 328 may be disposed between the antenna 312 and the user. The radiation blocking layer 328 may be comprised of a suitable material, such as lead, that is effective to prevent the transmission of cellular phone frequency radiation through it. Thus, any radiation that is not absorbed by the radiation blocker or reflected by the parasitic radiation redirection element 322 or parabolic reflector, is blocked from being transmitted to the body tissue of the user. Also, a surface layer 329, comprising a plating or thin layer of a metal, such as nickel, cobalt, aluminum, or gold may be provided to protect the radiation absorbing layer 308 from the effects of oxidation, and/or to provide a reflective surface to reflect the radiation signal emitted from the antenna back towards the open transmission area. As shown in FIG. 25, the configuration and dimensions of the elements of the inventive antenna assembly 306 may provide for a larger open transmission area 310, depending on the extent to which the emitted radiation is desired to be blocked or prevented from being transmitted. Alternatively, the open transmission area 310 may be decreased, if it is desired that the shielding effect of the inventive antenna assembly 306 is increased. As shown in FIG. 26, a second parasitic radiation redirection element 330 may be provided disposed at a position beyond the antenna assembly 306. The exact positions and number, as well as the configuration, composition and shape of the parasitic radiation redirection elements 322,330 will depend on the application and radiation transmission requirements.

Figure 27:
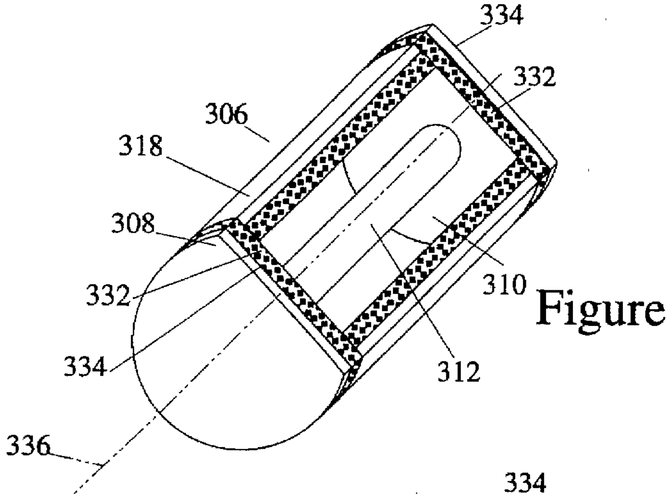
FIG. 27 shows the inventive antenna assembly and mounting means.

FIG. 27 shows an assembled antenna assembly 306, which further includes radiation absorber end portions 332 disposed at either side of the antenna 312, and mounting elements 334 for fixing and mounting the antenna assembly 306 to the inventive hand-held radio telephone 300. The antenna assembly 306 is mounted within an antenna housing 315 (shown, for example, in FIG. 15) so that during normal use of the hand-held radio telephone 300, the open transmission area 310 of the antenna assembly 306 is disposed relative to the antenna 312 in a direction away from the user, and the radiation absorber 308 is disposed relative to the antenna 312 in a direction toward the user. Thus, the portion of the radiation signal that is transmitted through the open transmission area 310 is directed in the direction of an orbiting satellite 302, and at least some of the radiation signal transmitted towards the user is blocked from being transmitted to the user. Thus, the antenna assembly 306 has a longitudinal axis 336 that is perpendicular to the cross section of the radiation absorber 308 (as shown in FIG. 19). The antenna assembly 306 is mounted within the antenna housing 315 of the inventive hand-held radio telephone 300 so that the longitudinal axis of the antenna assembly 306 is perpendicular to the longitudinal axis 338 of the hand-held radio telephone 300. By this configuration, the longitudinal axis of the antenna 312 is disposed at a generally horizontal orientation during use, and the open transmission area 310 faces at an angle upward and away from the user to effectively direct the transmitted radiation 316 away from the user and up towards an orbiting satellite 302. By this orientation, the user's body, including the head and hand, is protected from the conventionally occurring radiation exposure, and the enhance radiation signal is directed up towards it intended receiver, namely, an orbiting satellite.

Figure 28:
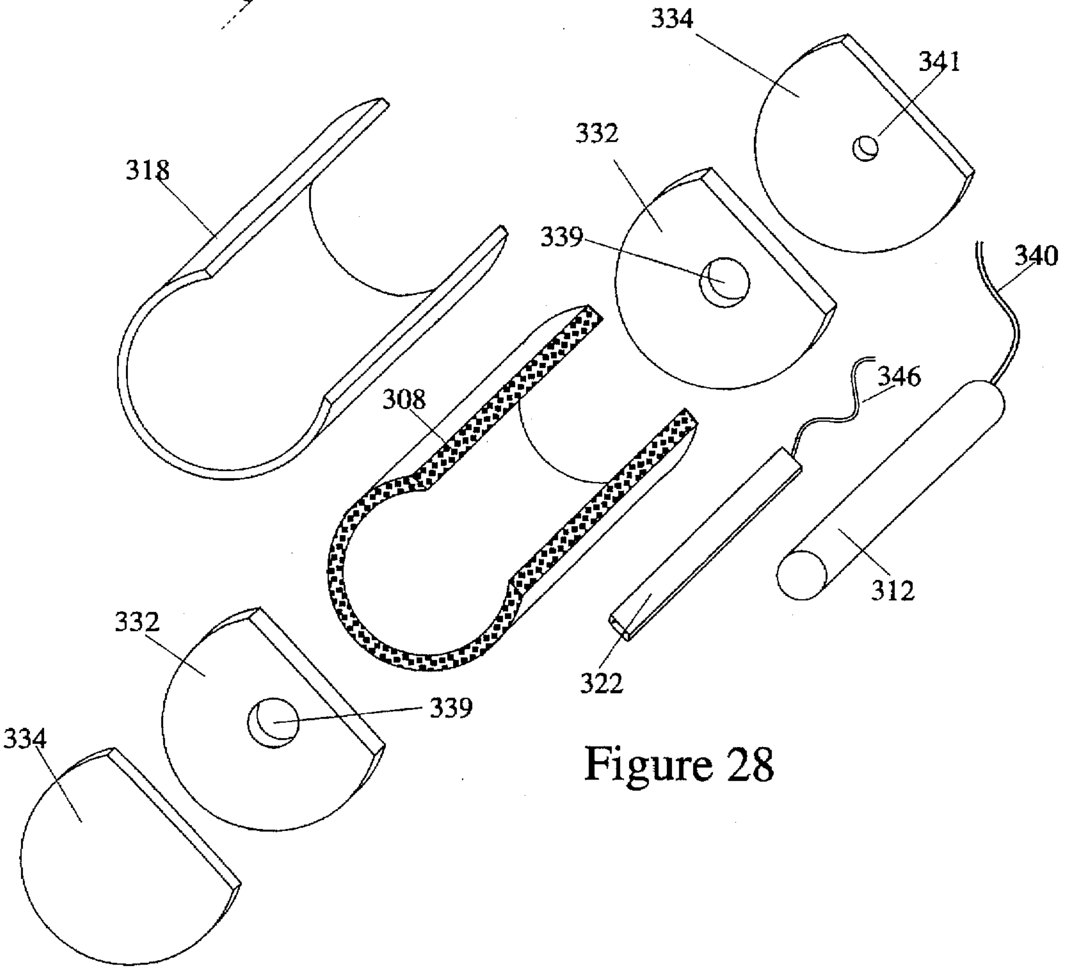
FIG. 28 shows the inventive antenna assembly and mounting means in an exploded view.

FIG. 28 shows an exploded view of the inventive antenna assembly 306. As shown, the antenna assembly 306 includes a radiation absorber 308 defining an open curved shape in cross section, so as to define an open transmission area 310. An antenna 312 is disposed adjacent to the open transmission area 310 and receives the radiation signal through a signal line 340 electrically connected to the appropriate circuit of the inventive hand-held radio telephone 300. The antenna 312 is supported by radiation absorber end portions 332. The antenna 312 is received by antenna through-holes 339 and supported by the radiation absorber end portions 332 disposed at either end of the antenna 312. The radiation absorber end portions 332 preferably have a composition that is effective at absorbing and/or blocking the transmission of radiation. A mounting element is fixed to each radiation absorber 308 end portion, and one of the mounting elements 334 has a signal line through-hole 341 through which the signal line 340 for the antenna 312 passes so that it can be in electrical contact with the appropriate circuits of the inventive hand-held radio telephone 300. Also, the parasitic radiation redirection element 322 includes a circuit ground line 346, which may also pass through the signal line through-hole 341. The circuit ground line 346 is preferably electrically connected with the circuit ground of the inventive hand-held radio telephone 300, so that the parasitic radiation redirection element 322 functions properly.

FIG. 29(*a*) shows another embodiment of the inventive antenna assembly and mounting means. The mounting elements 346 each define a respective open curve receiving surface 348 for receiving a corresponding open curve engaging structure 350 (shown disengaged and removed from the antenna assembly 306 for clarity). The open curve engaging structures 350 are fixed to or integrally formed with the interior walls 355 (shown cut-away from the case 12 of the inventive hand-held radio telephone 300). The open curve engaging structures 350 rotatably support the antenna assembly 306 within the antenna housing 315, thereby allowing the antenna assembly to pivot. A flange 352 is provided fixed to the antenna assembly 306 or integrally formed with the support structure 318. The flange 352 extends from the antenna assembly 306 and provides a structure by which a user can rotate the antenna assembly around its longitudinal axis while being rotatably supported within the antenna housing 315 via the open curve engaging structures 350. A spring loaded pin 354 passes through a through-hole in the case 12 of the inventive telephone and through a through-hole 356 in one of the open curve engaging structures 350. The spring loaded pin 354 engages with a receiving hole 358 disposed in the corresponding open curve receiving surface 348 to lock the antenna assembly and prevent it from pivoting. In accordance with this construction, the angle at which the open transmission area 310 faces relative to the phone case 12 can be changed. To change the angle, the spring loaded pin 354 is pulled from its current receiving hole 358, allowing the antenna assembly 306 to pivot. The user presses down or lifts up on the flange 352 to cause the antenna assembly 306 to pivot so that the open transmission area 310 is disposed at a different angle. The spring loaded pin 354 then engages another receiving hole 358 to lock the antenna assembly 306. The construction described above is for illustrative purposes. However, the construction described above demonstrates a mechanism for allowing the change of an angle at which the open transmission area 310 faces. By this feature, the direction at which the directed radiation signal is transmitted by the inventive telephone is optimized. For example, when used for communication with an orbiting satellite, it may be more advantageous for the open transmission area 310 to face up and away from the user during use of the inventive telephone. On the other hand, when used for communication with a ground-based cell site antenna, it may be more advantageous for the open transmission area 310 to face perpendicular or out and away from the user during use of the inventive telephone. To protect the components of the antenna assembly 306, a window 353 covers the open transmission area 310. The window 353 is at least partially transparent to the radiation signal emitted from the antenna assembly 306.

FIG. 29(*b*) is an enlarged, isolated and exploded view of the spring loaded pin 354 and the open curve engaging structure 350 in accordance with the embodiment of the inventive antenna assembly and mounting means shown in FIG. 29(*a*). When assembled, the spring loaded pin 354 passes through a spring 360, through the through-hole 356 of the open curve engaging structure 350 and through the through-hole in the case 12 of the inventive telephone. When the spring loaded pin 354 is pulled, the spring 360 is compressed between the open curve engaging structure 350 and a contacting surface 362 of the spring loaded pin 354. To lock the antenna assembly 306, the spring loaded pin 354 is urged by the spring 360 into the receiving hole 358 of the open curve receiving surface 348 as described with reference to FIG. 29(*a*).

Figure 30A:
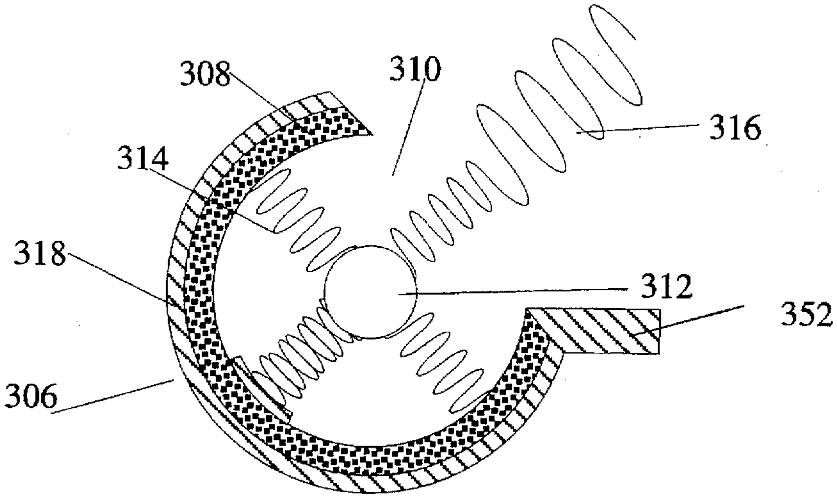
FIG. 30(*a*) is a cross sectional side view of the inventive antenna assembly shown in FIG. 29(*a*) disposed at an angle effective for communication with an orbiting satellite.
Figure 30B:
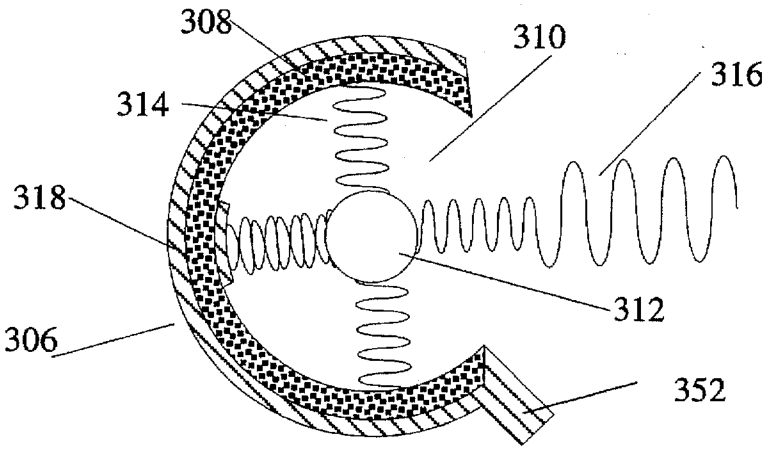

FIG. 30(*a*) is a cross sectional side view of the inventive antenna assembly shown in FIG. 29(*a*) disposed at an angle effective for communication with an orbiting satellite. At this angle, the open transmission area 310 is disposed so that the transmitted radiation signal 316 is directed up and away from the user and towards an orbiting satellite. FIG. 30(*b*) is a cross sectional side view of the inventive antenna assembly shown in FIG. 29(*a*) disposed at an angle effective for communication with a ground-based cell site antenna. At this angle, the open transmission area 310 is disposed so that the transmitted radiation signal 316 is directed out and away from the user and towards a ground-based cell site.

Figure 31A:
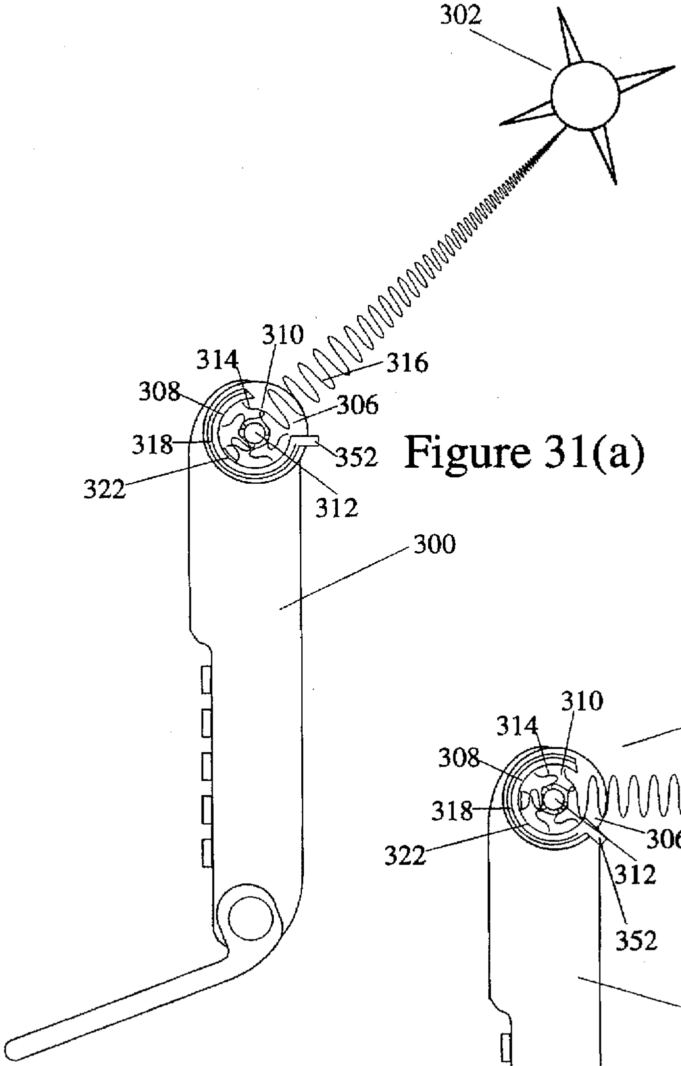
FIG. 31(*a*) is a schematic view of an embodiment of the inventive hand-held radio telephone having the inventive antenna assembly and mounting means shown in FIG. 29(*a*) transmitting to an orbiting satellite.
Figure 31B:
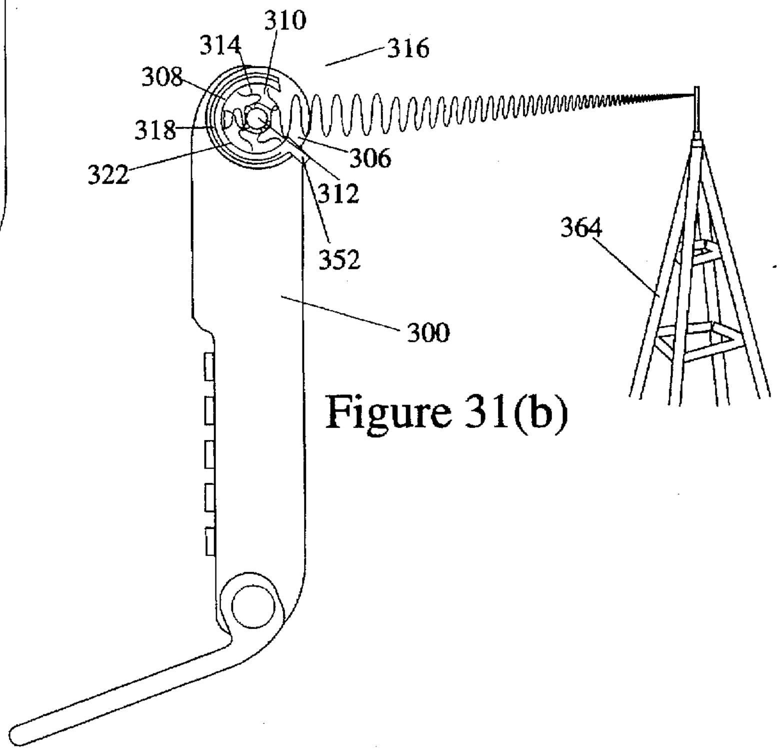

FIG. 31(*a*) is a schematic view of an embodiment of the inventive hand-held radio telephone having the inventive antenna assembly and mounting means shown in FIG. 29(*a*) transmitting to an orbiting satellite. As shown, the flange 352 extending from the antenna assembly 306 has been disposed so that the open transmission area 310 is disposed so that the transmitted radiation signal 316 is directed up and away from the user and towards an orbiting satellite 302. FIG. 31(*b*) is a schematic view of the embodiment of the inventive hand-held radio telephone shown in FIG. 31(*a*) having the inventive antenna assembly and mounting means shown in FIG. 29(*a*) transmitting to a ground-based cell site antenna 364. As shown, the flange 352 has been disposed so that the open transmission area 310 is disposed so that the open transmission area 310 is disposed so that the transmitted radiation signal 316 is directed out and away from the user and towards a ground-based cell site antenna 354. Thus, by the construction described above, the user can change the angle at which the directed radiation signal is transmitted from the inventive telephone to optimize communication with an orbiting satellite or a ground-based cell site. Other mechanisms may be used to rotatably support and allow the antenna assembly 306 to pivot.

Figure 33A:
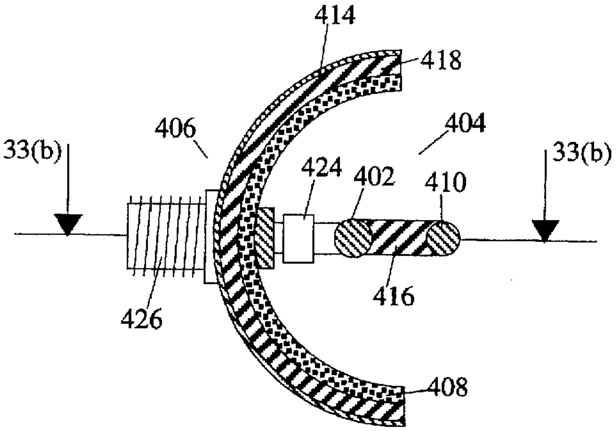
FIG. 33(*a*) is a cross-sectional view of an embodiment of an antenna assembly in accordance with another aspect of the present invention.
Figure 33B:
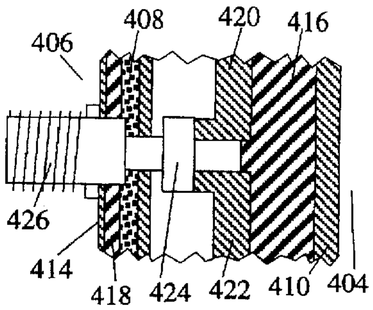

FIG. 33(*a*) is a cross-sectional view of an embodiment of an antenna 402 assembly in accordance with another aspect of the present invention, and FIG. 33(*b*) is a cross-sectional view of the antenna 402 assembly along line 33(*b*)—33(*b*). In accordance with this aspect of the present invention, an antenna 402 is provided for transmitting a radio signal from a radio signal transmitting device. The radio signal transmitting device may be, for example, a cellular telephone, a walkie-talkie, a ship-to-shore radio, or other radio devices capable of transmitting a radio signal. The radio signal is transmitted at a transmission side 404 of the antenna 402 assembly, and is blocked from transmission through a shielding side 406 of the antenna 402 assembly. A radiation absorber member 408 is disposed at the shielding side 406. The radiation absorber member 408 is disposed during use between the antenna 402 and a user of the radio signal transmitting device. A first parsitic element 410 is disposed during use between the antenna 402 and the user. A second parasitic element 412 412 is disposed at the transmission side 404. The second parasitic element 412 is disposed during use so that the antenna 402 is between the second parasitic element 412 and the user. Preferably, both the first parsitic element 410 and the second parasitic element 412 as disposed from the antenna 402 at a gap distance that is effective to direct a portion of the radio signal toward the transmission side 404 of the antenna 402 assembly. A metal shell member 414 is disposed at the shielding side 406. The metal shell member 414 is disposed during use between the radiation absorber member 408 and the user. In accordance with the present invention, the radio signal transmitted from the antenna 402 is blocked at the shielding side 406 to prevent exposure of the user to the radio signal. The radio signal is transmitted at the transmitting side for effective communication with a remote receiver, such as a terrestrial cell site, a satellite orbiting the earth, or other radio signal receiver.

Figure 34A:
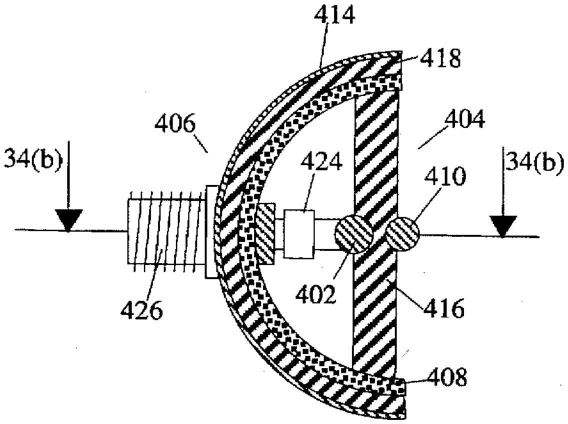
FIG. 34(*a*) is a cross-sectional view of another embodiment of the antenna assembly in accordance with the present invention.
Figure 34B:
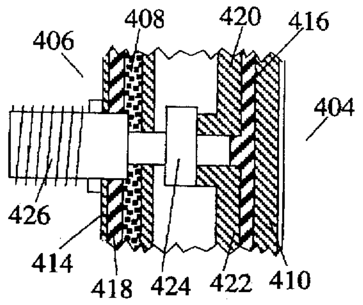

FIG. 34(*a*) is a cross-sectional view of another embodiment of the antenna 402 assembly in accordance With the present invention. FIG. 34(*b*) is a cross-sectional view of the antenna 402 assembly along line 34(*b*)—34(*b*). In accordance with this embodiment, a dielectric member 416 is disposed in the gap distance between the second parasitic element 412 and the antenna 402. The dielectric member 416 is disposed in a path of a portion of the radio signal propagating between the antenna 402 and the second parasitic element 412. The dielectric member 416 has a dielectric constant that is effective to reduce the gap distance to direct a portion of the radio signal toward the transmission side 404. The use of the dielectric member 416 reduces the overall size of the inventive antenna 402 assembly, since the gap distance between the antenna 402 and the second parasitic element 412 can be substantially reduced as compared with the use of a free-space, or air, gap between the antenna 402 and the second parasitic element 412.

Figure 35A:
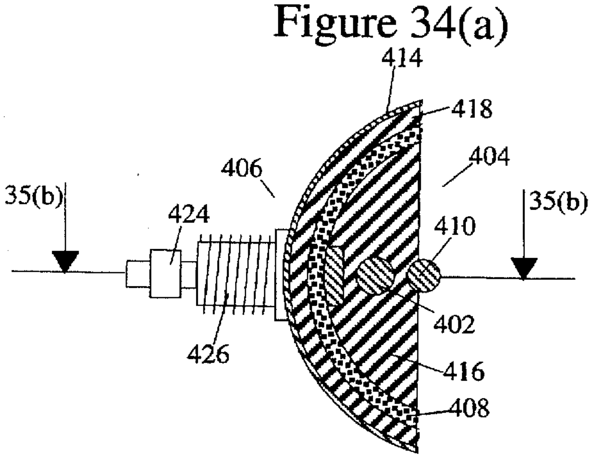
FIG. 35(*a*) is a cross-sectional view of another embodiment of the antenna assembly in accordance with the present invention.
Figure 35B:
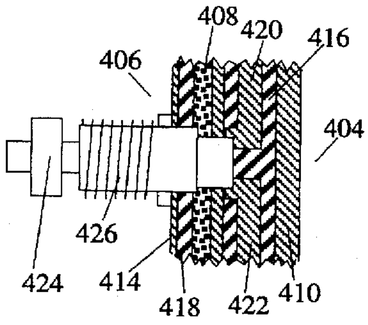

FIG. 35(*a*) is a cross-sectional view of another embodiment of the antenna 402 assembly. FIG. 35(*b*) is a cross-sectional view of the antenna 402 assembly along line 35(*b*)—35(*b*). In accordance with this embodiment, the dielectric member 416 is disposed between the antenna 402 and both the first and the second parasitic element 412*s*. The dielectric member 416 is disposed in the part of the portion of the radio signal that propagates between the antenna 402 and each of the first parsitic element 410 and the second parasitic element 412. The dielectric member 416 has a dielectric constant that is effective to reduce the gap distance so as to direct a portion of the radio signal towards the transmission side 404. In accordance with this construction, the overall size of the inventive antenna 402 assembly can be further reduced since the gap distance necessary for directing the radio signal toward the transmission side 404 can be reduced as compared with a free-space, air, gap.

Figure 36:
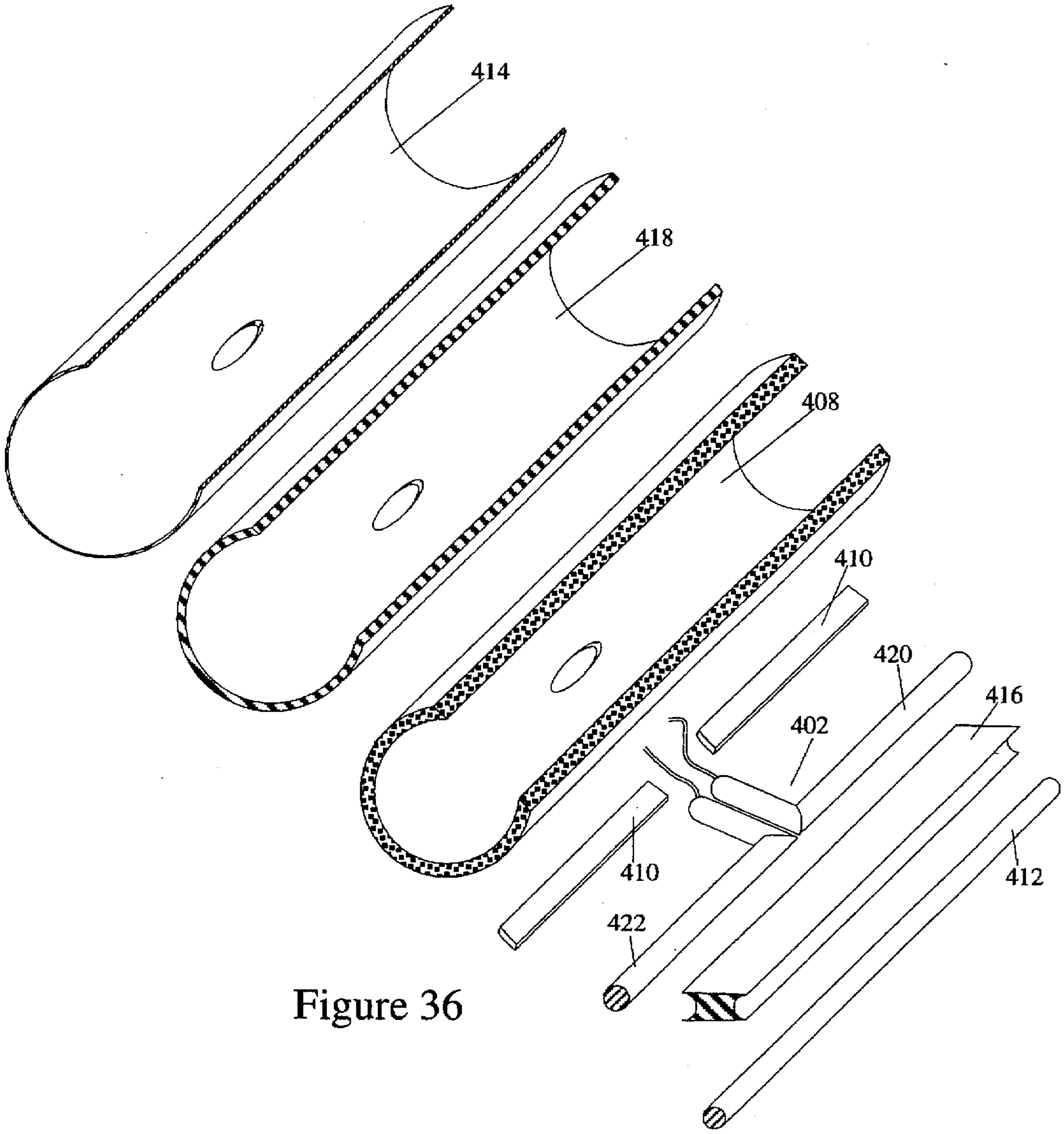
FIG. 36 is an exploded view of the inventive antenna assembly shown in FIG. 33(*a*)
Figure 37A:
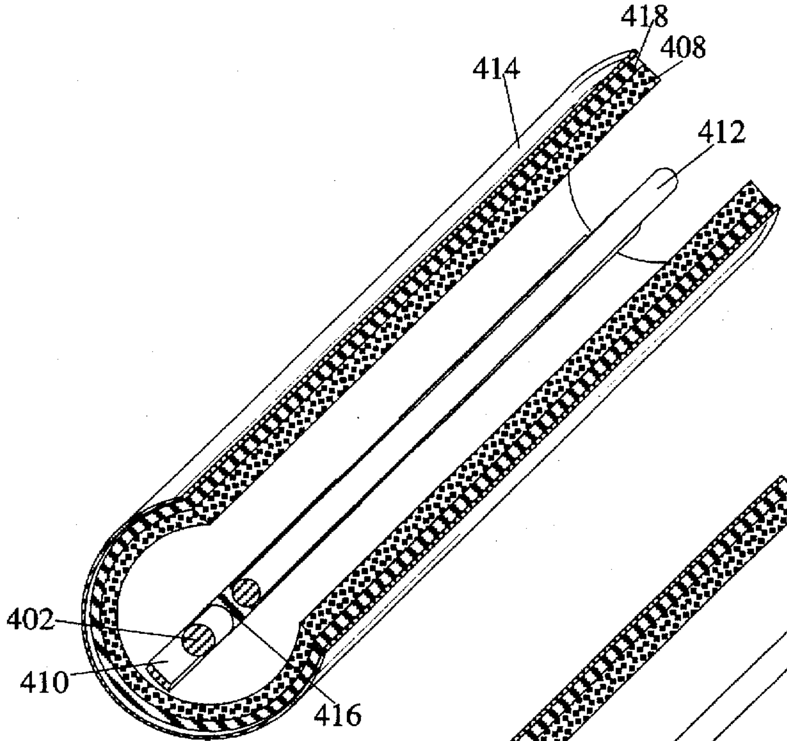
FIG. 37(*a*) is a perspective view of the antenna assembly shown in FIG. 33(*a*)
Figure 37B:
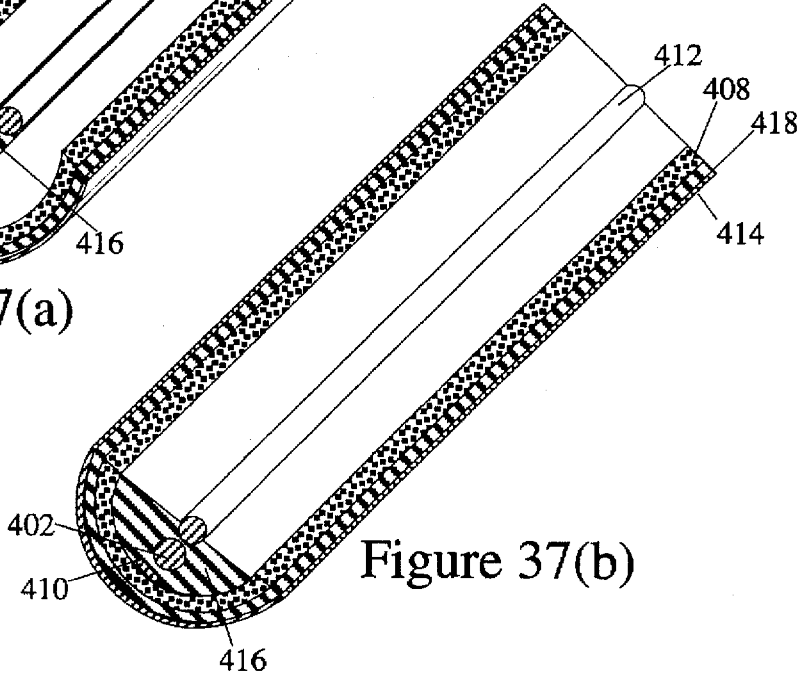

FIG. 36 is an exploded view of the inventive antenna 402 assembly shown in FIG. 33(*a*). In accordance with the present invention, the inventive antenna 402 assembly is constructed by disposing a metal shell around a support element 418 that is lined with the radiation absorber member 408. In accordance with this embodiment, a dipole antenna 402 comprised of a first antenna 402 segment and a second antenna 402 segment is provided. Preferably, each antenna 402 segment has an effective antenna 402 length of substantially ¼ of the wave length of the radio signal transmitted by the radio signal transmitting device. Thus, the antenna 402 has an effective length of substantially ½ of the wave length of the radio signal transmitted by the radio signal transmitting device. A first parsitic element 410 is disposed adjacent to the radiation absorber, and may be comprised of a first and second segment. Preferably, the overall effective length of the first parsitic element 410 is equal to substantially ½ of the wave length of the radio signal transmitted by the radio signal transmitting device. In accordance with this embodiment of the inventive antenna 402 assembly, a dielectric standoff 416 is disposed between the second parasitic element 412 and the antenna 402 to maintain the second parasitic element 412 at its correct position relative to the antenna 402. Preferably, the second parasitic element 412 has an effective length that is substantially ½ of the wave length of the radio signal transmitted by the radio signal transmitting device. If the path that the radio signal propagates through between the second parasitic element 412 and the antenna 402 is substantially a free-space, air, gap, then preferably the second parasitic element 412 is disposed from the antenna 402 at a distance of ¹⁄₁₀th of the wave length of the radio signal transmitted by the radio signal transmitting device. FIG. 37(*a*) is a perspective view of an antenna 402 assembly constructed in accordance with the antenna 402 assembly shown in FIG. 33(*a*), and FIG. 37(*b*) is a perspective view of an antenna 402 assembly constructed in accordance with the antenna 402 assembly shown in FIG. 35(*a*). As shown, for example, in FIG. 33(*a*), a matching device 424 is provided for matching the antenna 402 impedance to the transmission line of the radio transmitting device. The antenna 402 assembly is mounted on the radio transmitting device through the use of a standard connector 426. An antenna 402 assembly was constructed in accordance with the embodiment shown in FIG. 37(*a*) (also shown in FIGS. 33(*a*), 33(*b*), and FIG. 36). This embodiment of the inventive antenna 402 assembly was compared with a representative conventional antenna 402 assembly selected from the commercially available cellular telephones. The radiation pattern of the antenna 402 assembly of the commercially available cellular telephone was determined to obtain a comparison standard. The inventive antenna 402 assembly was then substituted for the antenna 402 assembly of the commercially available cellular telephone antenna 402 and its radiation pattern was then determined. The results of the experimental tests indicate that as compared with the conventional antenna 402 assembly, the inventive antenna 402 assembly obtains a s96.4% reduction in radiated power toward the user (towards the shielding side 406) and a 357% increase in radiated power forward (towards the transmission side 404), translating into an 88% range increase. Furthermore, when used as an antenna 402 assembly of a cellular telephone, the inventive antenna 402 assembly reduces the power output requirements for effective communication with a cell site. Thus, the battery time of the cellular telephone is increased, and a more distant cell site can be transmitted to, as compared with the use of a conventional antenna 402 assembly. Also, a reduction of at least −14 db, or approximately 96%, of the radiation exposure of the user is obtained as compared with the conventional antenna 402 assembly.

To further enhance the performance of the inventive antenna 402 assembly, the support element 418 supporting the radiation absorber and/or the metal shell member 414 may be formed of a dielectric material. The dielectric material preferably has a dielectric constant that is effective to approximate a gap distance between the metal shell member 414 and the radiation absorber as being a free space, air gap distance of ½ of the wave length of the radio signal transmitted by the radio signal transmitting device. In accordance with this aspect of the invention, a portion of the radio signal that is not absorbed by the radiation absorber member 408 (and thus transmits towards the user) is reflected by the metal shell back towards the transmission side 404 of the antenna 402 assembly as a reinforcing wave propagated through the dielectric support element 418.

Figure 38A:
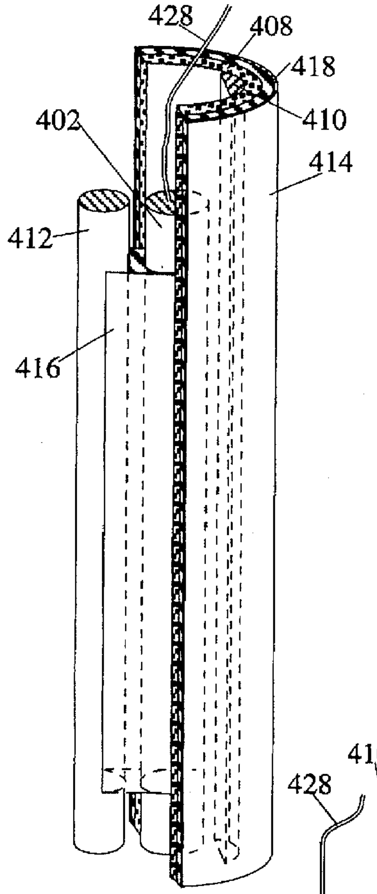
FIG. 38(*a*) is a perspective view of an embodiment of an antenna assembly comprising one half of an inventive dual antenna assembly.
Figure 38B:
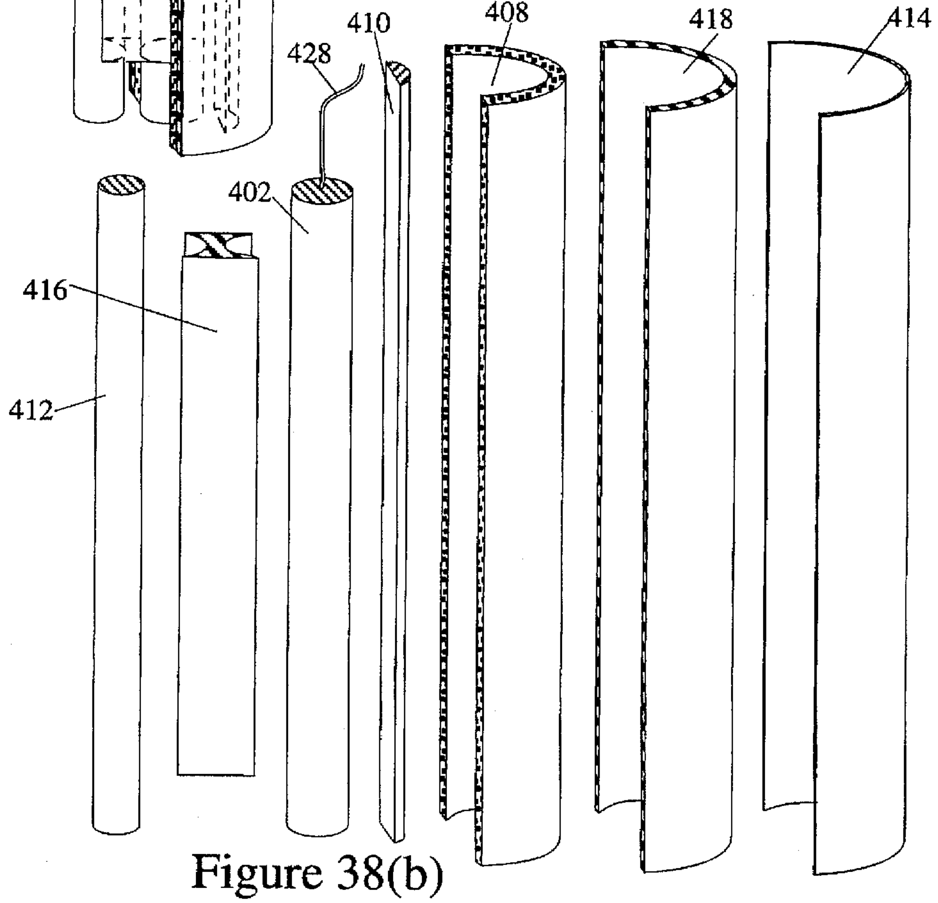

FIG. 38 is a perspective view of an embodiment of an antenna 402 assembly comprising ½ of an inventive dual antenna 402 assembly. In accordance with this aspect of the invention, a dual antenna 402 assembly includes a first and second antenna 402 assembly, each comprising ½ of a dipole antenna 402 system. Each antenna 402 assembly includes an antenna 402 for transmitting a radio signal from a radio signal transmitting device, such as a cellular telephone, walkie-talkie, ship-to-shore radio, or other radio communication system. The radio signal is transmitted at a transmission side 404 of the antenna 402 assembly, and is blocked from transmission from a shielding side 406 of the antenna 402 assembly. A radiation absorber member 408 is disposed at the shielding side 406. The radiation absorber member 408 is disposed during use between the antenna 402 and a user of the radio signal transmitting device. A first parsitic element 410 is disposed during use between the antenna 402 and the user. As shown, the first parsitic element 410 may be disposed adjacent to the absorber member 408. A second parasitic element 412 is disposed at the transmission side 404. The second parasitic element 412 is disposed during use so that the antenna 402 is between the second parasitic element 412 and the user. At least one of the first and the second parasitic element 412*s* is disposed from the antenna 402 at a gap distance effective to direct a portion of the radio signal toward the transmission side 404. A metal shell member 414 is disposed at the shielding side 406, and is disposed during use between the radiation absorber member 408 and the user. The radio signal transmitted from the antenna 402 is blocked at the shielding side 406 to prevent exposure of the user to the radio signal. The radio signal is transmitted at the transmitting side for effective communication with a remote receiver. Each of the antenna 402 assemblies of the dual antenna 402 assembly includes an antenna 402 lead for connecting the respective antenna 402 assembly to a transmission circuit of the radio transmitting device. As shown in FIGS. 38(*a*) and 38(*b*), each of the first and the second antenna 402 assembly of the dual antenna 402 assembly may be constructed similarly with the construction of the antenna 402 assembly shown, for example, in FIG. 33(*a*) and FIG. 36. However, in accordance with this aspect of the invention, each of the first and the second antenna 402 assembly has a respective monopole antenna 402 element, so that the respective antenna 402*s* of the first and the second antenna 402 assembly can co-act in the manner of a dipole antenna 402.

Figure 39A:
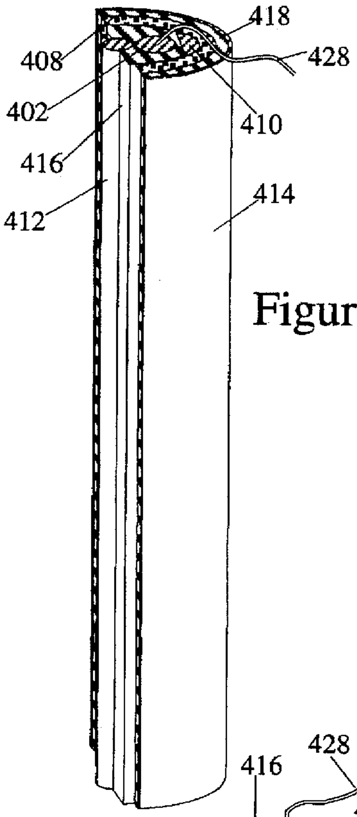
FIG. 39(*a*) is a perspective view of another embodiment of an antenna assembly comprising one half of an inventive dual antenna assembly.
Figure 39B:
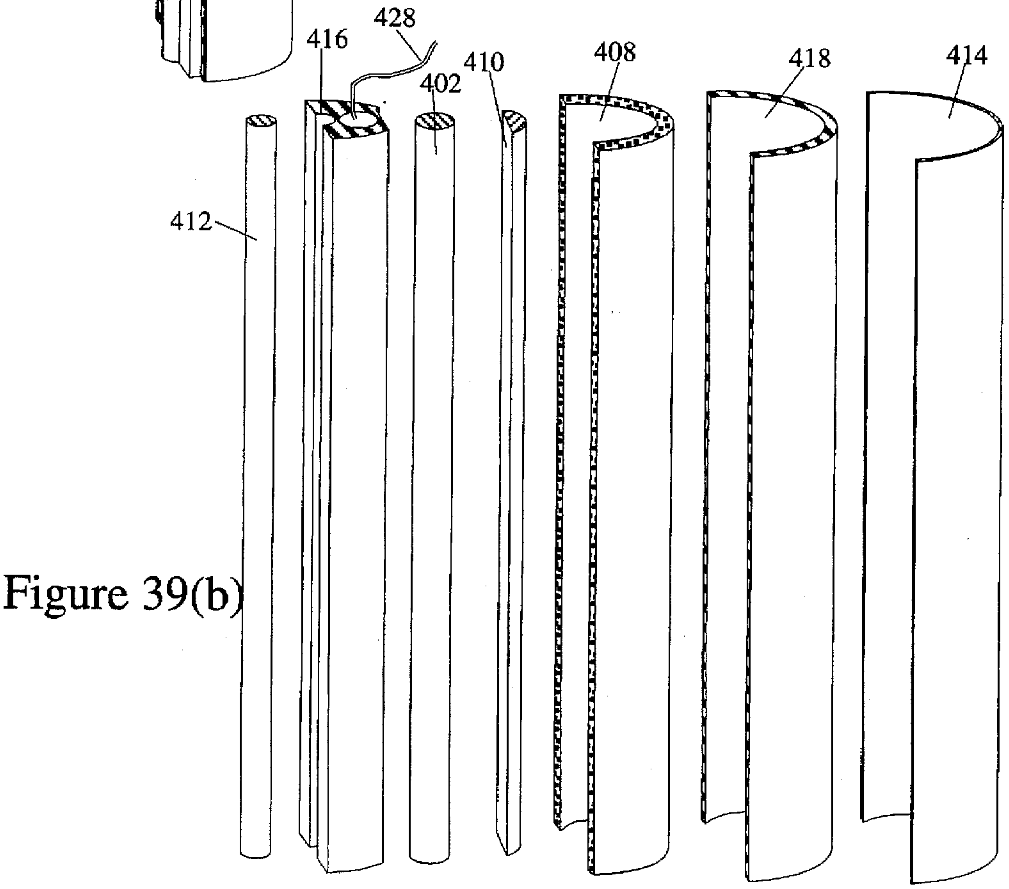

FIGS. 39(*a*) and 39(*b*) are perspective and exploded views of an antenna 402 assembly utilizing the size reduction capabilities of a dielectric member 416. As described above, if the path by which a radio signal propagates between the antenna 402 and the first and/or second parasitic element 412 it is through an appropriate dielectric material, the overall size of the antenna 402 assembly can be reduced as compared with the use of an air gap.

Figure 40A:
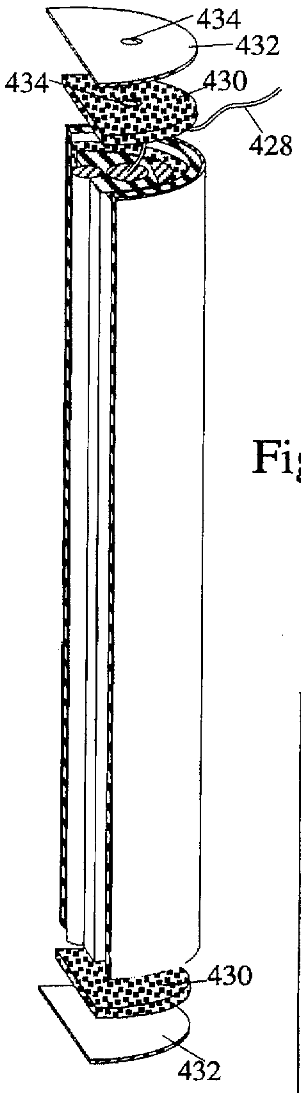
FIG. 40(*a*) is a partial exploded view the antenna assembly shown in FIG. 39(*a*) having radiation absorbing end caps and metal end caps.
Figure 40B:
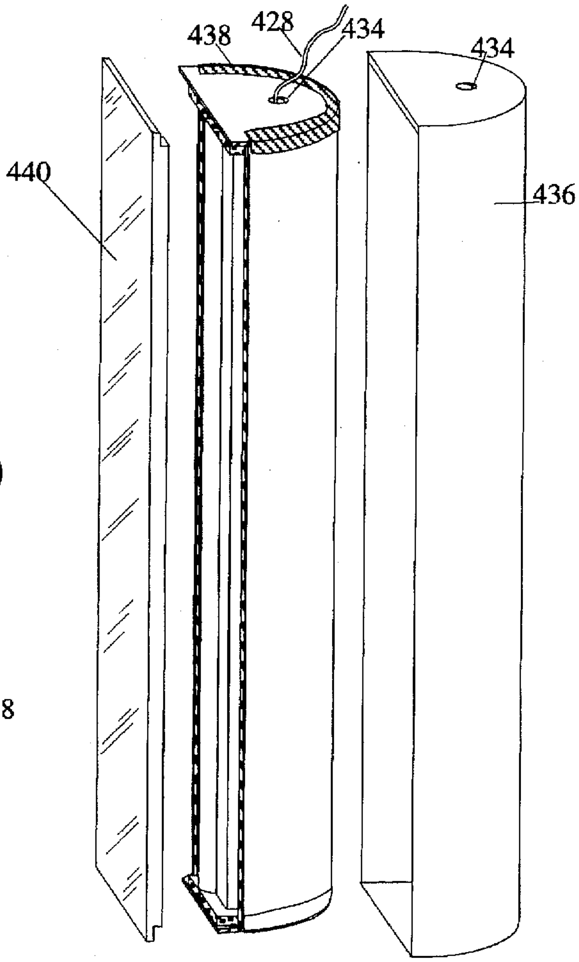
Figure 40C:
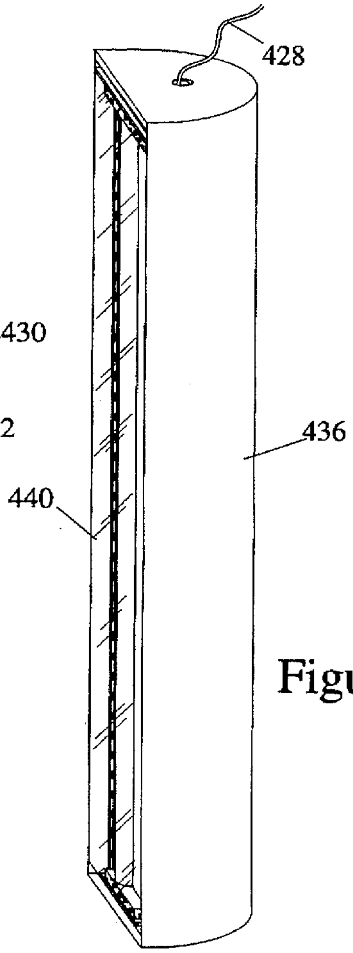

FIG. 40(*a*) shows the antenna 402 assembly shown in FIG. 39(*a*) having radiation absorber end caps 430 and metal end caps 432 to further enhance the performance of the inventive antenna 402 assembly. Appropriate through hole 934*s* are provided in the radiation absorber and metal end caps 432 to allow passage of an antenna 402 lead line. As shown in FIG. 40(*b*), each antenna 402 assembly of the inventive dual antenna 402 assembly may be housed within an assembly housing 436, which can easily be formed through an injection molding process or the like. Before being installed in the assembly housing 436, the metal end caps 432 are secured in place through the use of an adhesive, or as shown through the use of an adhesive tape 438. Of course, other fastening methods may be utilized, and the metal caps and/or the radiation absorber end caps 430 may be integrally formed with their respective corresponding component of the antenna 402 assembly. A radio signal transmissive window 440 may be provided for preventing damage to the antenna 402 assembly. Thus, as shown in FIG. 40(*c*), once assembled the inventive antenna 402 assembly has a shielding side 406 enclosed by an assembly housing 436, and a transmission side 404 protected by a radio signal transmissive window 440.

Figure 41B:
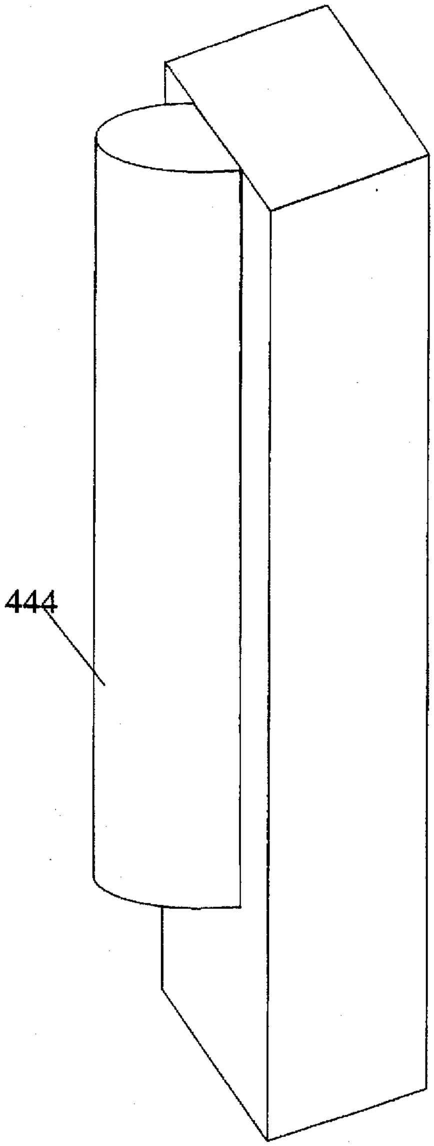
FIG. 41(*a*) is a perspective view of an external rechargeable battery pack.
Figure 41A:
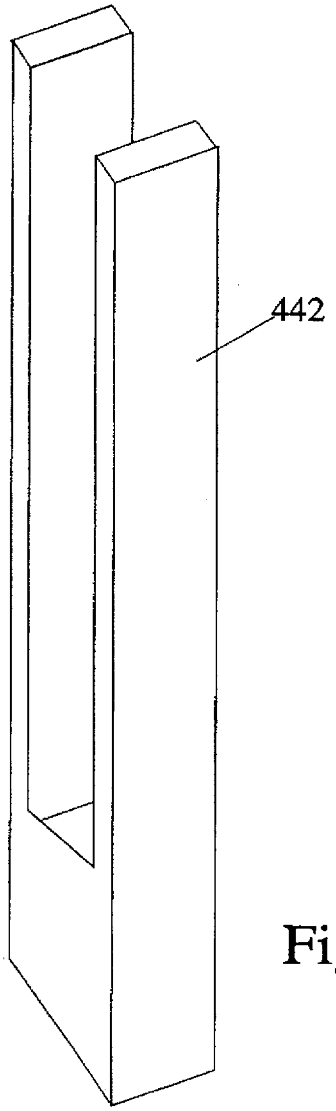
Figure 42A:
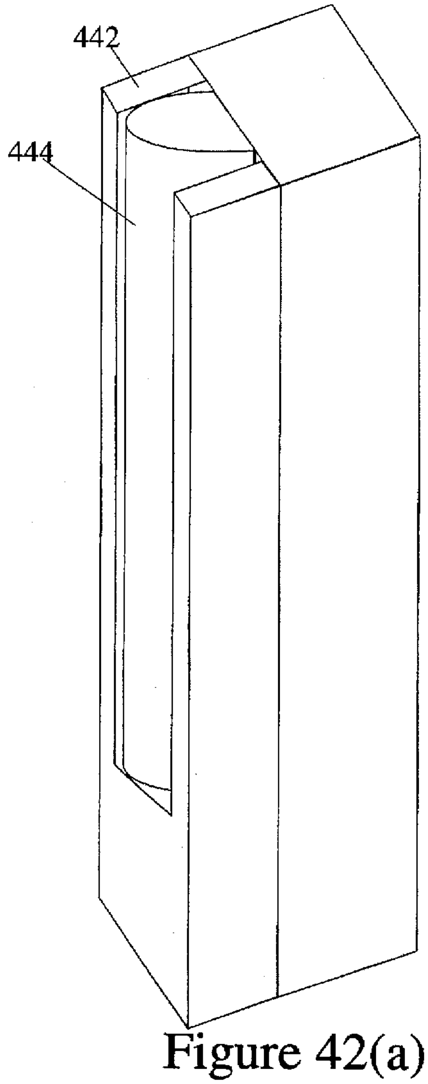
FIG. 42(*a*) is a perspective view of the radio transmitting device shown in FIG. 41(*b*) having installed on it the battery pack shown in FIG. 41(*a*) and having the inventive dual antenna assembly disposed in a closed position.
Figure 42B:
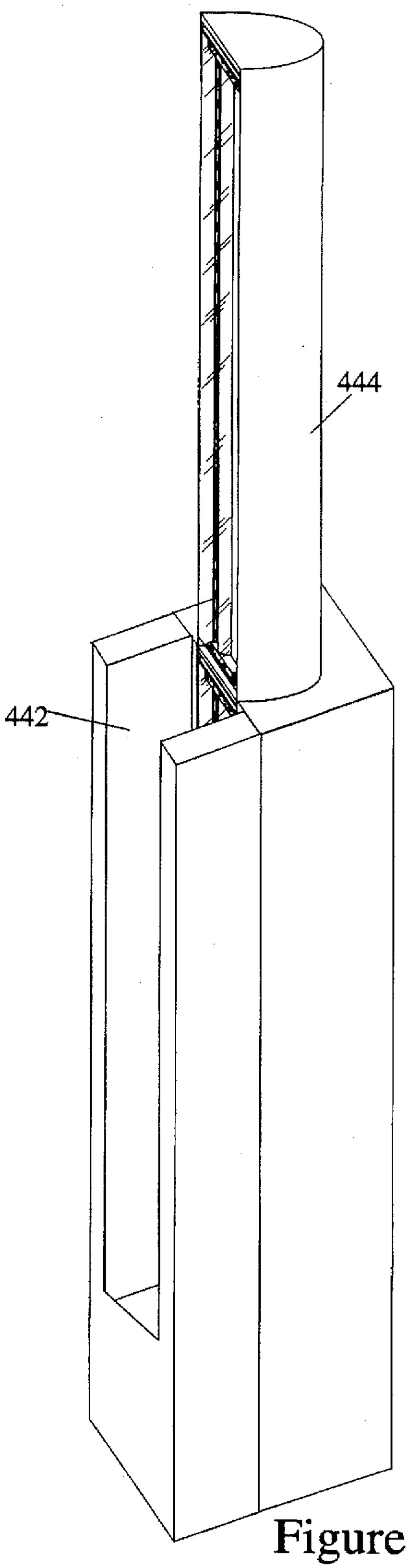
Figure 43A:
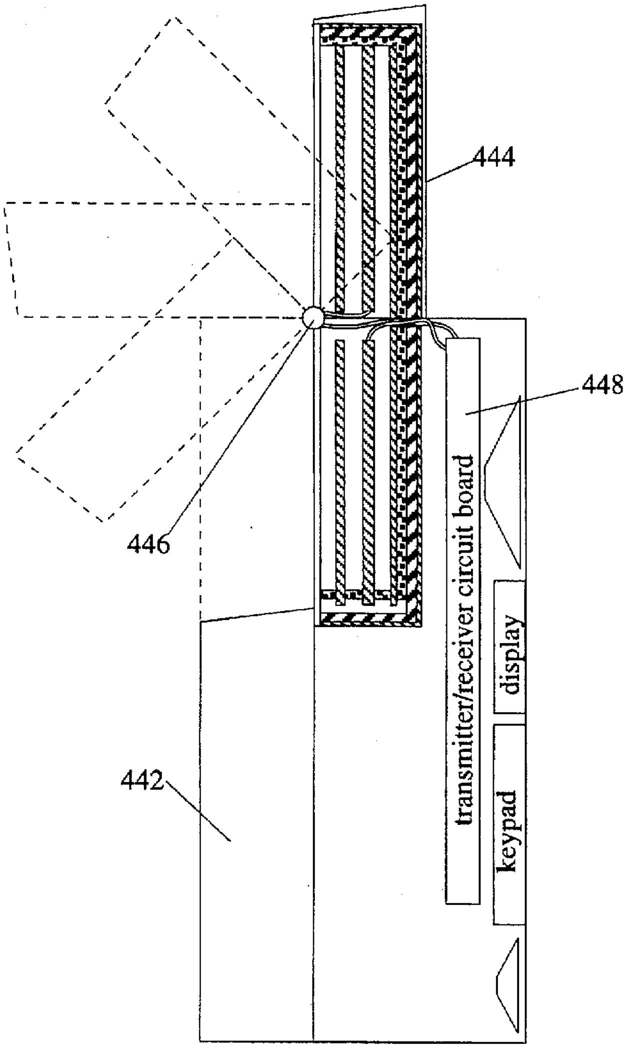
FIG. 43(*a*) is a schematic view of a radio transmitting device having the inventive dual antenna assembly in an open, in-use position.
Figure 43B:
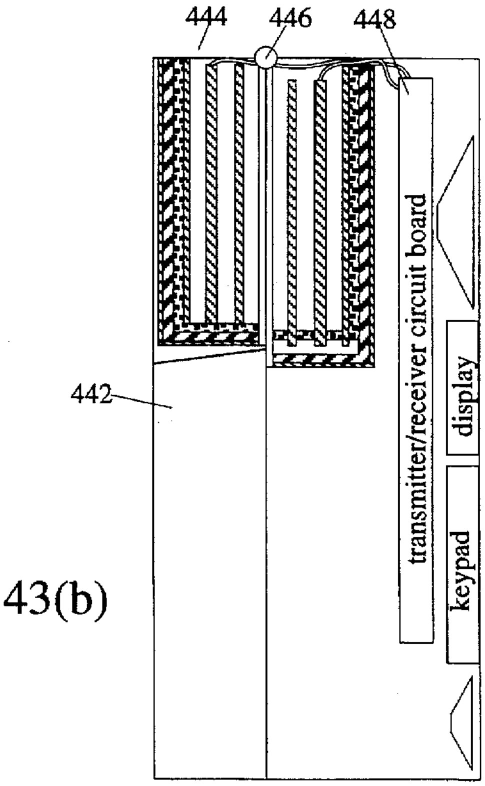

FIG. 41(*a*) is a perspective view of a rechargeable battery pack 442 for use with a radio transmitting device, such as a cellular telephone. FIG. 41(*b*) shows a perspective view of a radio signal transmitting device, such as a cellular telephone, having an embodiment of the inventive dual antenna 402 assembly. FIG. 42(*a*) is a perspective view of the radio transmitting device shown in FIG. 41(*b*) having installed on it the battery pack 442 shown in FIG. 41(*a*). In this view, the radio transmitting device is shown having the inventive dual antenna 402 assembly disposed in a closed position. FIG. 42(*b*) is a perspective view of the radio transmitting device having the inventive dual antenna 402 assembly disposed in an open, in-use position. During times when the radio transmitting device is not in use or is in a standby mode, the user may desire to reduce the overall size of the device, thus, during these times the inventive dual antenna 402 assembly can be folded down in a closed position. A separate receiving antenna 402 may be provided for receiving transmission signals from a remote sender, such as a cell site. Thus, even if the dual antenna 402 assembly is in the closed position, the signals from the cell site may be received. The dual antenna 402 assembly is disposed on the radio transmitting device so that a first antenna 402 assembly is enclosed within the radio transmitting device body, and the second antenna 402 assembly is pivotally fixed to the radio signal transmitting device body. In this case, pivoting means (hinge 446, or the like) is provided for pivoting the first antenna 402 assembly relative to the second antenna 402 assembly. Thus, as shown in FIG. 43(*a*), to position the inventive dual antenna 402 assembly in an open, in-use position, the user pivots the first antenna 402 assembly relative to the second antenna 402 assembly into the open position. In this open position, the transmission side 404 of the dual antenna 402 assembly is disposed pointing away from the user during use of the radio transmitting device, and the shielding side 406 of the dual antenna 402 assembly is disposed facing the user. Thus, the range enhancing aspects of the inventive antenna 402 assembly can be utilized for effective communication with a remote receiver, while preventing exposure of the user to the potentially harmful effects of the emitted radiation. As shown in FIG. 43(*b*), to dispose the dual antenna 402 assembly in the closed position, the user pivots the first antenna 402 assembly back downwards towards the body of the radio transmitting device.

In accordance with this aspect of the present invention, signal applying means (transmitter/receiver circuit board 448) of the radio signal transmitting device simultaneously applies a radio signal from the transmission circuit to both the first and the second antenna 402 assembly. In this case, a first frequency is applied to the first and the second antenna 402 assembly via respective first and second antenna 402 leads. Thus, the two antenna 402 elements of the first antenna 402 assembly and the second antenna 402 assembly, respectively, act in combination as an antenna 402 having an effective antenna 402 length equal to the sum of the effective antenna 402 length of the respective antenna 402 of the first and second antenna 402 assembly. Stated otherwise, in this use, the dual antenna 402 assembly acts as a dipole antenna 402, with each of the poles of the dipole being constituted by the respective antenna 402 element of the first and second antenna 402 assemblies. Thus, for example, when used for communication via a terrestrial cellular telephone network, the frequency of the radio signal is typically on the order 830+/− MHz. In this case, the effective antenna 402 length should be equal to ½ of the wave length of the radio signal.

Furthermore, the inventive dual antenna 402 assembly can be utilized for communication with a terrestrial cell site having a predetermined frequency, and also with a satellite based communication system having a frequency which is twice that of the cell site frequency. In this case, the signal applying means applies a radio signal from the transmission circuit having a second frequency to either of the first and the second antenna 402 assemblies via the respective first and second antenna 402 lead, so that either the antenna 402 of the first antenna 402 assembly or the antenna 402 of the second antenna 402 assembly acts separately as an antenna 402 having an effective antenna 402 length that is equal to the effective antenna 402 length of the antenna 402. Stated otherwise, since the satellite based communication system utilizes a frequency that is twice that of the frequency used for terrestrial based cellular communication, the wave length of the radio signal used for satellite communication will be ½ of the wave length of the radio signal used for terrestrial cellular communication. Therefore, in accordance with the present invention, by utilizing only one antenna 402 assembly (applying the radio signal to one antenna 402 element), thus antenna 402 element acts effectively as a monopole antenna 402 for communication. Thus, the same dual antenna 402 assembly can be utilized for both terrestrial cellular base communication and satellite based communication to thereby greatly enhance the usefulness of the radio communication device.

Figure 44A:
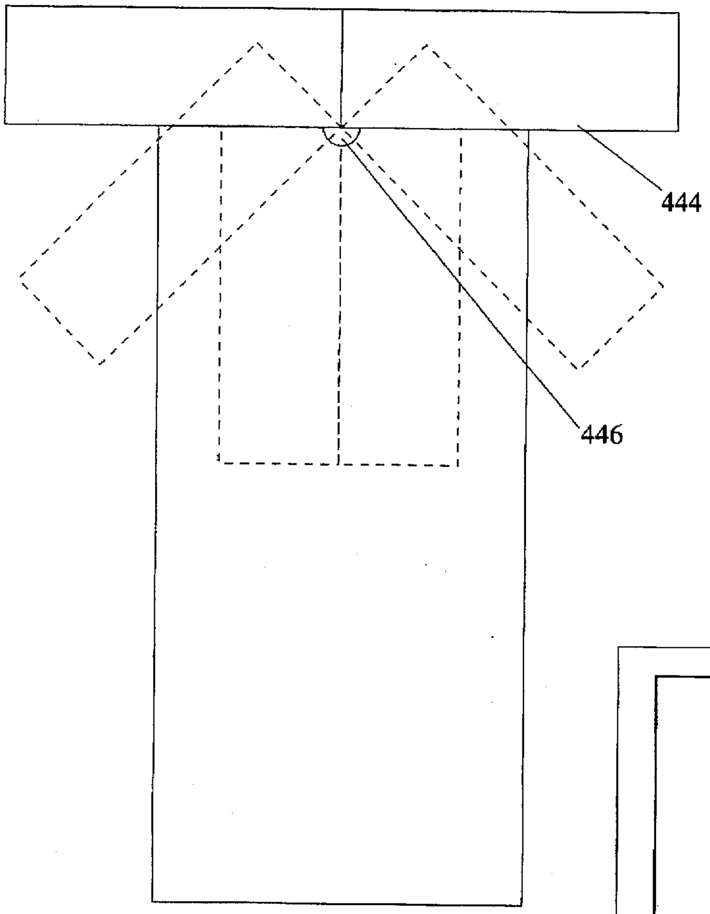
FIG. 44(*a*) is a schematic view of an alternative configuration of the inventive dual antenna assembly disposed on a radio transmitting device.
Figure 44:
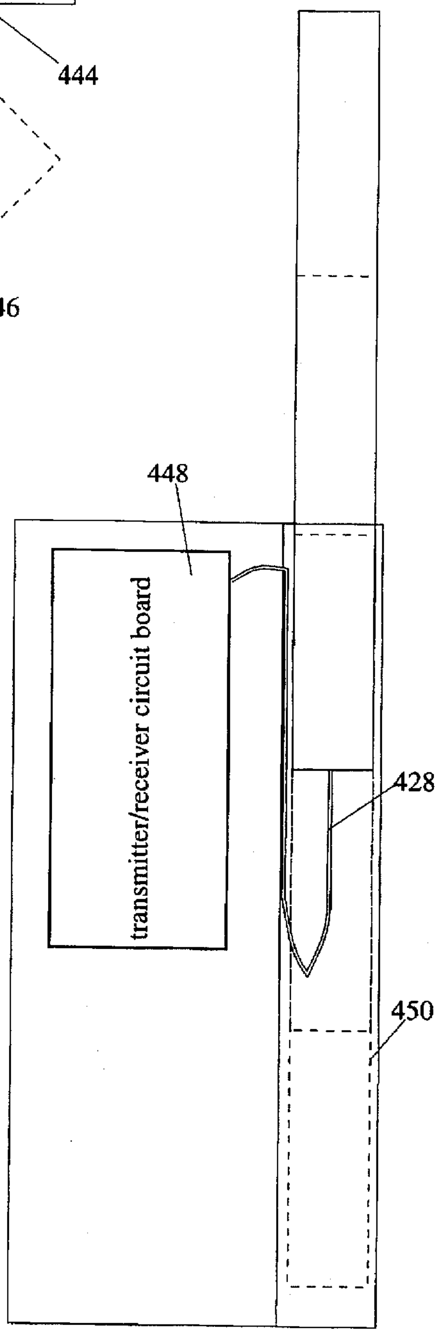

FIG. 44(*a*) schematically shows an alternative configuration of the inventive dual antenna 402 assembly disposed on a radio transmitting device. In this case, the first antenna 402 assembly and the second antenna 402 assembly are disposed side by side at the back of the radio transmitting device and are hinge 446*d* together by a pivoting means supported on the body of the radio transmitting device. To place the inventive dual antenna 402 assembly in the in-use open position, the first antenna 402 assembly and the second antenna 402 assembly are swung up into the position shown. For storage, the first antenna 402 assembly and the second antenna 402 assembly can be pivoted into the side-by-side relationship shown by the dotted lines. FIG. 44(*b*) schematically shows an embodiment of the inventive antenna 402 assembly disposed on a radio transmitting device. In this case, the antenna 402 assembly (such as that shown in FIG. 33(*a*) is received within a receiving channel 450 450 disposed within the body of the radio transmitting device. During use, the inventive antenna 402 assembly is extended from the cavity.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

We claim:

1. An antenna assembly for use with a radio signal transmitting device, comprising: an antenna for transmitting a radio signal from a radio signal transmitting device, the radio signal being transmitted at a transmission side of the antenna assembly and being block from transmission through a shielding side of the antenna assembly; a radiation absorber member disposed at the shielding side and disposed during use between the antenna and a user of the radio signal transmitting device; at least one of a first parasitic element disposed during use between the antenna and the user, and a second parasitic element disposed at the transmission side and disposed during use so that the antenna is between the second parasitic element and the user, at least one of the first and the second parasitic element being disposed from the antenna at a gap distance effective to direct a portion of the radio signal toward the transmission side; and a metal shell member disposed at the shielding side and disposed during use between the radiation absorber member and the user; whereby the radio signal transmitted from the antenna is blocked at the shielding side to prevent exposure of the user to the radio signal and is transmitted at the transmitting side for effective communication with a remote receiver.

2. An antenna assembly according to claim 1; further comprising a support element for supporting at least one of the radiation absorber member and the metal shell member, the support element having a thickness and a dielectric constant effective to approximate a gap distance between the metal shell member and the radiation absorber as being an air-space gap distance of one-half of the wavelength of the radio signal transmitted by the radio signal transmitting device.

3. An antenna assembly according to claim 1; wherein the antenna has an effective antenna length of substantially one-half of the wavelength of a radio signal transmitted by the radio signal transmitting device.

4. An antenna assembly according to claim 3; wherein at least one of the first and the second parasitic element has a length of substantially one-half of the wavelength of the radio signal transmitted by the radio signal transmitting device.

5. An antenna assembly according to claim 4; wherein at least a portion of the gap distance is an air-space, and at least one of the first and the second parasitic element is disposed from the antenna at a distance of one-tenth of the wavelength of the radio signal transmitted by the radio signal transmitting device.

6. An antenna assembly according to claim 1; wherein the antenna comprises a first antenna segment and a second antenna segment, each antenna segment having an effective antenna length of substantially one-quarter of the wavelength of a radio signal transmitted by the radio signal transmitting device so that the antenna has an effective antenna length of substantially one-half of the wavelength of the radio signal transmitted by the radio signal transmitting device.

7. An antenna assembly according to claim 1; further comprising a dielectric member disposed in the gap distance between at least one of the first and the second parasitic element and the antenna, the dielectric member being disposed in a path of a portion of the radio signal propagating between the antenna and said either of the first and the second parasitic element, the dielectric member having a dielectric constant effective to reduce the gap distance effective to direct a portion of the radio signal toward the transmission side.

8. An antenna assembly according to claim 1; wherein the radiation absorber member has a semicircular cross-section having an arc length of at least 180 degrees.

9. An antenna assembly according to claim 1; wherein the radiation absorber comprises a conductive material dispersed in a non-conductive matrix.

10. An antenna assembly according to claim 1; wherein the conductive material comprises at least one of a conductive free metal, $FeO_2$, titanium oxide, a ferromagnetic material, carbonyl iron, ferrite oxide, garnet, magnesium, nickel, lithium, yttrium, and calcium vanadium.

11. An antenna assembly for use with a radio signal transmitting device, comprising: an antenna for transmitting a radio signal from a radio signal transmitting device, the radio signal being transmitted at a transmission side of the antenna assembly and being block from transmission through a shielding side of the antenna assembly; a radiation absorber member disposed at the shielding side and disposed during use between the antenna and a user of the radio signal transmitting device; at least one of a first parasitic element disposed during use between the antenna and the user, and a second parasitic element disposed at the transmission side and disposed during use so that the antenna is between the second parasitic element and the user, at least one of the first and the second parasitic element being disposed from the antenna at a gap distance effective to direct a portion of the radio signal toward the transmission side; a dielectric member disposed in the gap distance between at least one of the first and the second parasitic element and the antenna, the dielectric member being disposed in a path of a portion of the radio signal propagating between the antenna and said either of the first and the second parasitic element, the dielectric member having a dielectric constant effective to reduce the gap distance effective to direct a portion of the radio signal toward the transmission side; and a metal shell member disposed at the shielding side and disposed during use between the radiation absorber member and the user; whereby the radio signal transmitted from the antenna is blocked at the shielding side to prevent exposure of the user to the radio signal and is transmitted at the transmitting side for effective communication with a remote receiver.

12. An antenna assembly according to claim 11; wherein the antenna has an effective antenna length of substantially one-half of the wavelength of a radio signal transmitted by the radio signal transmitting device; at least one of the first and the second parasitic element has a length of substantially one-half of the wavelength of the radio signal transmitted by the radio signal transmitting device; and the dielectric member has a thickness and a dielectric constant effective to approximate the gap distance as being an air-space gap distance of one-tenth of the wavelength of the radio signal transmitted by the radio signal transmitting device.

13. An antenna assembly according to claim 11; further comprising a support element for supporting at least one of the radiation absorber member and the metal shell member, the support element having a thickness and a dielectric constant effective to approximate a gap distance between the metal shell member and the radiation absorber as being an air-space gap distance of one-half of the wavelength of the radio signal transmitted by the radio signal transmitting device.

14. An antenna assembly according to claim 11; wherein the radiation absorber comprises a conductive material dispersed in a non-conductive matrix.

15. An antenna assembly according to claim 11; wherein the conductive material comprises at least one of a conductive free metal, $FeO_2$, titanium oxide, a ferromagnetic material, carbonyl iron, ferrite oxide, garnet, magnesium, nickel, lithium, yttrium, and calcium vanadium.

16. A dual antenna assembly for use with a radio signal transmitting device, comprising: a first and a second antenna assembly, each comprising an antenna for transmitting a radio signal from a radio signal transmitting device, the radio signal being transmitted at a transmission side of the antenna assembly and being block from transmission through a shielding side of the antenna assembly, a radiation absorber member disposed at the shielding side and disposed during use between the antenna and a user of the radio signal transmitting device, at least one of a first parasitic element disposed during use between the antenna and the user, and a second parasitic element disposed at the transmission side and disposed during use so that the antenna is between the second parasitic element and the user, at least one of the first and the second parasitic element being disposed from the antenna at a gap distance effective to direct a portion of the radio signal toward the transmission side, and a metal shell member disposed at the shielding side and disposed during use between the radiation absorber member and the user, so that the radio signal transmitted from the antenna is blocked at the shielding side to prevent exposure of the user to the radio signal and is transmitted at the transmitting side for effective communication with a remote receiver; a first antenna lead for connecting the first antenna assembly to a transmission circuit of the radio transmitting device; and a second antenna lead for connecting the second antenna assembly to the transmission circuit of the radio transmitting device.

17. A dual antenna assembly according to claim 16, further comprising; pivoting means for pivoting the first antenna assembly relative to the second antenna assembly.

18. A dual antenna assembly according to claim 16, further comprising: signal applying means for simultaneously applying a radio signal from the transmission circuit having a first frequency to both the first and the second antenna assembly via the respective first and second antenna lead so that the antenna of the first antenna assembly and the antenna of the second antenna assembly act in combination as an antenna having an effective antenna length equal to the sum of the effective antenna length of the respective antenna of the first and the second antenna assembly, and for applying a radio signal from the transmission circuit having a second frequency to either of the first and the second antenna assembly via the respective first and second antenna lead so that either the antenna of the first antenna assembly and the antenna of the second antenna assembly acts separately as an antenna having an effective antenna length equal to the effective antenna length of the respective antenna of the first and the second antenna assembly receiving the second frequency, the second frequency being different than the first frequency.

19. A dual antenna assembly according to claim 18; wherein the second frequency is equal to twice the first frequency.

20. A dual antenna assembly according to claim 18; wherein the antenna of each of the first antenna assembly and the second antenna assembly has an effective antenna length of substantially one-half of the wavelength of a radio signal having the second frequency.

* * * * *